United States Patent
He et al.

(10) Patent No.: US 9,681,326 B2
(45) Date of Patent: Jun. 13, 2017

(54) HYBRID AUTOMATIC REPEAT REQUEST (HARQ) MAPPING FOR CARRIER AGGREGATION (CA)

(71) Applicant: INTEL CORPORATION, Santa Clara, CA (US)

(72) Inventors: Hong He, Beijing (CN); Seunghee Han, Kyoungkido (KR); Debdeep Chatterjee, Santa Clara, CA (US); Jong-Kae Fwu, Sunnyvale, CA (US); Rui Huang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 99 days.

(21) Appl. No.: 13/867,018

(22) Filed: Apr. 19, 2013

(65) Prior Publication Data

US 2014/0092824 A1    Apr. 3, 2014

Related U.S. Application Data

(60) Provisional application No. 61/707,784, filed on Sep. 28, 2012.

(51) Int. Cl.
  *H04L 1/18*     (2006.01)
  *H04L 5/00*     (2006.01)
  (Continued)

(52) U.S. Cl.
  CPC .......... *H04W 28/0205* (2013.01); *H04B 5/00* (2013.01); *H04B 17/318* (2015.01);
  (Continued)

(58) Field of Classification Search
  CPC ......... H04L 1/12–1/20; H04L 5/0053–5/0058; H04L 5/001
  See application file for complete search history.

(56) References Cited

U.S. PATENT DOCUMENTS

| | | |
|---|---|---|
| 2008/0192676 A1 | 8/2008 | Mantha |
| 2010/0169732 A1 | 7/2010 | Wu |
| | (Continued) | |

FOREIGN PATENT DOCUMENTS

| | | |
|---|---|---|
| CN | 1430859 A | 7/2003 |
| CN | 101795183 A | 8/2010 |
| | (Continued) | |

OTHER PUBLICATIONS

3GPP TS 36.213 V11.0.0 "Technical Specification Group Radio Access Networ, Evolved Universal Terrestrial Radio Access (E-UTRA) Physical layer procedures" Relase 11, Sep. 18, 2012 , pp. 119-131.*

(Continued)

*Primary Examiner* — Marcus R Smith
(74) *Attorney, Agent, or Firm* — Thorpe North & Western

(57) ABSTRACT

Technology for conditional hybrid automatic retransmission re-quest (HARQ) mapping for carrier aggregation (CA) is disclosed. One method can include a user equipment (UE) determining when a subframe for physical downlink shared channel (PDSCH) transmission is configured for downlink semi-persistent scheduling (SPS). The subframe configured for downlink SPS can generate a first condition. The UE can generate HARQ-ACK states for the first condition for a HARQ bundling window with discontinuous transmission (DTX) padding for a secondary HARQ bundling window size for a secondary cell (SCell) and a primary HARQ bundling window size for a primary cell (PCell). The UE can generate HARQ-ACK states for a second condition for the HARQ bundling window with DTX padding including a DTX padding exception. The second condition can include conditions not covered by the first condition. The DTC padding exception can generate a set of HARQ-ACK states to uniquely define each padded HARQ-ACK state.

15 Claims, 22 Drawing Sheets

(51) Int. Cl.

| | | |
|---|---|---|
| H04W 72/04 | (2009.01) | |
| H04W 28/02 | (2009.01) | |
| H04W 48/14 | (2009.01) | |
| H04W 76/04 | (2009.01) | |
| H04W 76/02 | (2009.01) | |
| H04L 29/06 | (2006.01) | |
| H04W 52/02 | (2009.01) | |
| H04W 24/02 | (2009.01) | |
| H04W 40/00 | (2009.01) | |
| H04W 76/06 | (2009.01) | |
| H04B 17/318 | (2015.01) | |
| H04B 5/00 | (2006.01) | |
| H04J 3/16 | (2006.01) | |
| H04J 11/00 | (2006.01) | |
| H04L 5/14 | (2006.01) | |
| H04L 12/24 | (2006.01) | |
| H04L 29/08 | (2006.01) | |
| H04W 4/00 | (2009.01) | |
| H04W 8/08 | (2009.01) | |
| H04W 24/08 | (2009.01) | |
| H04W 24/10 | (2009.01) | |
| H04W 28/08 | (2009.01) | |
| H04W 28/16 | (2009.01) | |
| H04W 36/00 | (2009.01) | |
| H04W 36/22 | (2009.01) | |
| H04W 40/24 | (2009.01) | |
| H04W 48/16 | (2009.01) | |
| H04W 48/20 | (2009.01) | |
| H04W 52/04 | (2009.01) | |
| H04W 52/14 | (2009.01) | |
| H04W 72/02 | (2009.01) | |
| H04W 72/12 | (2009.01) | |
| H04W 74/00 | (2009.01) | |
| H04W 88/02 | (2009.01) | |
| H04W 72/08 | (2009.01) | |
| H04W 36/08 | (2009.01) | |
| H04W 48/18 | (2009.01) | |
| H04W 88/08 | (2009.01) | |
| H04W 72/00 | (2009.01) | |
| H04W 80/10 | (2009.01) | |
| H04W 88/18 | (2009.01) | |
| H04W 84/12 | (2009.01) | |

(52) U.S. Cl.
CPC ......... *H04J 3/1694* (2013.01); *H04J 11/0086* (2013.01); *H04L 1/1812* (2013.01); *H04L 1/1861* (2013.01); *H04L 1/1864* (2013.01); *H04L 1/1893* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/5032* (2013.01); *H04L 65/4084* (2013.01); *H04L 65/60* (2013.01); *H04L 65/602* (2013.01); *H04L 65/608* (2013.01); *H04L 67/10* (2013.01); *H04W 4/005* (2013.01); *H04W 8/08* (2013.01); *H04W 24/02* (2013.01); *H04W 24/08* (2013.01); *H04W 24/10* (2013.01); *H04W 28/0215* (2013.01); *H04W 28/0221* (2013.01); *H04W 28/0268* (2013.01); *H04W 28/08* (2013.01); *H04W 28/16* (2013.01); *H04W 36/0061* (2013.01); *H04W 36/0083* (2013.01); *H04W 36/0088* (2013.01); *H04W 36/22* (2013.01); *H04W 40/005* (2013.01); *H04W 40/246* (2013.01); *H04W 48/14* (2013.01); *H04W 48/16* (2013.01); *H04W 48/20* (2013.01); *H04W 52/0209* (2013.01); *H04W 52/0212* (2013.01); *H04W 52/0225* (2013.01); *H04W 52/0235* (2013.01); *H04W 52/0258* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/0453* (2013.01); *H04W 72/0486* (2013.01); *H04W 72/082* (2013.01); *H04W 72/1284* (2013.01); *H04W 74/002* (2013.01); *H04W 74/004* (2013.01); *H04W 76/022* (2013.01); *H04W 76/025* (2013.01); *H04W 76/043* (2013.01); *H04W 76/046* (2013.01); *H04W 76/048* (2013.01); *H04W 76/06* (2013.01); *H04W 88/02* (2013.01); *H04L 5/001* (2013.01); *H04W 36/08* (2013.01); *H04W 48/18* (2013.01); *H04W 52/0261* (2013.01); *H04W 72/005* (2013.01); *H04W 80/10* (2013.01); *H04W 84/12* (2013.01); *H04W 88/08* (2013.01); *H04W 88/18* (2013.01); *Y02B 60/50* (2013.01)

(56) References Cited

U.S. PATENT DOCUMENTS

| | | | |
|---|---|---|---|
| 2012/0087254 A1 | 4/2012 | Yin et al. | |
| 2012/0134305 A1 | 5/2012 | Damnjanovic et al. | |
| 2013/0223296 A1* | 8/2013 | Zeng et al. | 370/280 |
| 2013/0242814 A1* | 9/2013 | Wang et al. | 370/280 |
| 2013/0301433 A1* | 11/2013 | Yin et al. | 370/252 |
| 2013/0322357 A1 | 12/2013 | He et al. | |
| 2013/0322358 A1 | 12/2013 | He et al. | |
| 2014/0036749 A1* | 2/2014 | Wang et al. | 370/311 |

FOREIGN PATENT DOCUMENTS

| | | |
|---|---|---|
| WO | 2012/036534 A2 | 3/2012 |
| WO | WO 2012/036533 A1 | 3/2012 |
| WO | WO 2012/061257 A1 | 5/2012 |

OTHER PUBLICATIONS

Zhu et al., "Advanced Wireless Communication Systems and Techniques", U.S. Appl. No. 61/653,369, filed May 30, 2012, 95 Pages.

Choi et al., "Advanced Wireless Communication Systems and Techniques", U.S. Appl. No. 61/667,325, filed Jul. 2, 2012, 196 Pages.

He et al., "Hybrid Automatic Repeat Request (HARQ) Mapping for Carrier Aggregation (CA)", U.S. Appl. No. 13/853,404, filed Mar. 29, 2013, 50 Pages.

He et al., "Hybrid Automatic Repeat Request (HARQ) Mapping for Carrier Aggregation (CA)", U.S. Appl. No. 13/853,390, filed Mar. 29, 2013, 41 Pages.

International Search Report and Written Opinion received for PCT Patent Application No. PCT/US2013/060019, mailed on Dec. 27, 2013, 11 pages.

3GPP TS 36.213 V10.1.0, "Technical Specification Group Radio Access Network, Evolved Universal Terrestrial Radio Access (E-UTRA), Physical layer procedures", Release 10, Mar. 2011, pp. 1-115.

Zhu, et al. "Advanced Wireless Communication Systems and Techniques" U.S. Appl. No. 61/653,369, filed May 30, 2012, 95 Pages.

Choi et al. "Advanced Wireless Communication Systems and Techniques" U.S. Appl. No. 61/667,325, filed Jul. 2, 2012, 196 Pages.

ETSI TS 136 211 V10.1.0, "LTE, Evolved Universal Terrestrial Radio Access (E-UTRA), Physical Channels and Modulation", Release 10, Apr. 2011, pp. 1-105.

(56) References Cited

OTHER PUBLICATIONS

He, et al., "A Novel Method of PUCCH Resource Allocation for PUCCH Format 1b with Channel Selection in LTE System", IDF 96590.

Research in Motion et al, "HARQ-ACK for Inter-band CA with Different UL/DL Configurations", 3GPP TSG RAN WG1 R1-123185, Aug. 2012, Meeting 70, Agenda 7.2.3, 4 pages, Qingdao, China.

* cited by examiner

| UL-DL configuration for PDSCH HARQ timing reference | | SCell SIB1 UL-DL configuration | | | | | | |
|---|---|---|---|---|---|---|---|---|
| | | 0 | 1 | 2 | 3 | 4 | 5 | 6 |
| PCell SIB1 UL-DL configuration | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

FIG. 5
(Table 4)

|  | PCell | | SCell | | | |
| --- | --- | --- | --- | --- | --- | --- |
| DL subframe index | 1 | 2 (SPS) | 1 | 2 | 3 | 4 |
| PDSCH transmitted at eNB | Yes | Yes | Yes | Yes | No | No |
| The actual PDSCH detection status by UE | ACK | NACK | DTX | NACK | DTX | DTX |
| PDSCH reception interpreted by eNB | NACK | ACK | ACK | ACK | N/D | DTX |

FIG. 8
(Table 5)

| Value of 'TPC command for PUCCH' | $n_{PUCCH}^{(1,p)}$ |
| --- | --- |
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

FIG. 10
(Table 6)

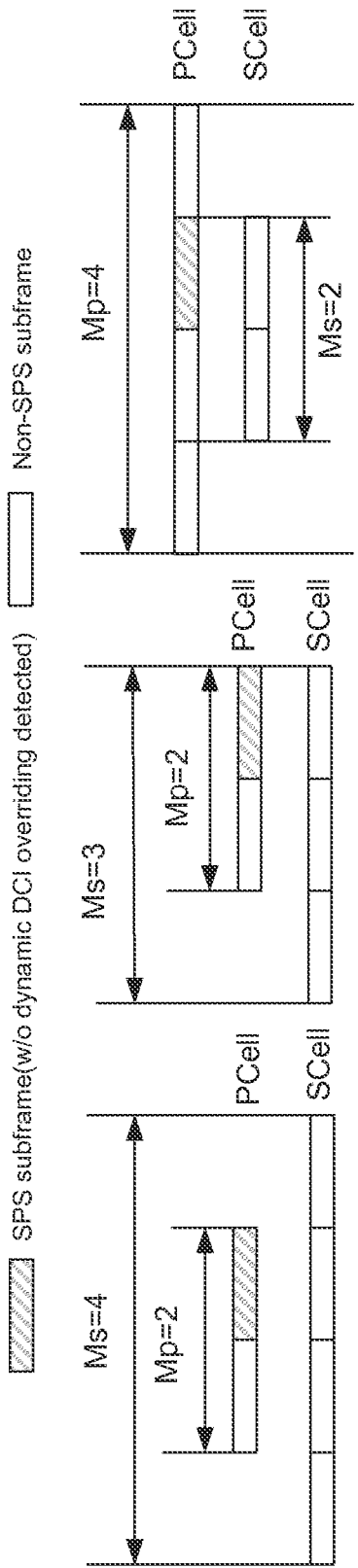

| HARQ-ACK(0), HARQ-ACK(1) | $n^{(1)}_{PUCCH}$ | $b(0),b(1)$ |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | No transmission | |

FIG. 15
(Table 7)

| HARQ-ACK(0), HARQ-ACK(1), HARQ-ACK(2) | $n^{(1)}_{PUCCH}$ | $b(0),b(1)$ |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | No transmission | |

FIG. 16
(Table 8)

| HARQ-ACK(0), HARQ-ACK(1), HARQ-ACK(2), HARQ-ACK(3) | $n_{PUCCH}^{(1)}$ | $b(0), b(1)$ |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | No transmission | |

FIG. 17
(Table 9)

| HARQ-ACK(0), HARQ-ACK(1) | $n^{(1)}_{PUCCH}$ | $b(0)b(1)$ |
|---|---|---|
| ACK, ACK | $n^{(1)}_{PUCCH,1}$ | 1, 0 |
| ACK, NACK/DTX | $n^{(1)}_{PUCCH,0}$ | 1, 1 |
| NACK/DTX, ACK | $n^{(1)}_{PUCCH,1}$ | 0, 1 |
| NACK, NACK/DTX | $n^{(1)}_{PUCCH,0}$ | 0, 0 |
| DTX, NACK/DTX | No Transmission | |

FIG. 18
(Table 10)

| HARQ-ACK(0), HARQ-ACK(1), HARQ-ACK(2) | $n^{(1)}_{PUCCH}$ | $b(0)b(1)$ |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 0 |
| ACK, NACK/DTX, ACK | $n^{(1)}_{PUCCH,2}$ | 1, 0 |
| ACK, NACK/DTX, NACK/DTX | $n^{(1)}_{PUCCH,0}$ | 1, 1 |
| NACK/DTX, ACK, ACK | $n^{(1)}_{PUCCH,2}$ | 0, 1 |
| NACK/DTX, ACK, NACK/DTX | $n^{(1)}_{PUCCH,1}$ | 0, 1 |
| NACK/DTX, NACK/DTX, ACK | $n^{(1)}_{PUCCH,2}$ | 0, 0 |
| NACK, NACK/DTX, NACK/DTX | $n^{(1)}_{PUCCH,0}$ | 0, 0 |
| DTX, NACK/DTX, NACK/DTX | No Transmission | |

FIG. 19
(Table 11)

| HARQ-ACK(0), HARQ-ACK(1), HARQ-ACK(2), HARQ-ACK(3) | $n^{(1)}_{PUCCH}$ | $b(0)b(1)$ |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,2}$ | 1, 1 |
| ACK, ACK, NACK/DTX, ACK | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 1, 1 |
| ACK, NACK/DTX, ACK, NACK/DTX | $n^{(1)}_{PUCCH,2}$ | 1, 0 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,1}$ | 0, 0 |
| NACK/DTX, ACK, ACK, NACK/DTX | $n^{(1)}_{PUCCH,2}$ | 0, 1 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| NACK, NACK/DTX, NACK/DTX, NACK/DTX | $n^{(1)}_{PUCCH,0}$ | 0, 0 |
| DTX, NACK/DTX, NACK/DTX, NACK/DTX | No Transmission | |

FIG. 20
(Table 12)

| Primary Cell | Secondary Cell | Resource | Constellation | RM Code Input Bits |
|---|---|---|---|---|
| HARQ-ACK(0), HARQ-ACK(1), HARQ-ACK(2) | HARQ-ACK(0), HARQ-ACK(1), HARQ-ACK(2) | $n_{PUCCH}^{(1)}$ | $b(0), b(1)$ | $o(0), o(1), o(2), o(3)$ |
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

FIG. 21
(Table 13)

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation $b(0), b(1)$ | RM Code Input Bits $o(0), o(1), o(2), o(3)$ |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |

FIG. 22
(Table 14)

| HARQ-ACK(0), HARQ-ACK(1), HARQ-ACK(2), HARQ-ACK(3) | Mapped state |
|---|---|
| 'D, any, any, any' or no DL assignment is received. | D, D |
| 'A, D, D, D' | A, N |
| 'A, A, N/D, any' | N, A |
| 'A, A, A, N/D' | A, A |
| 'A, A, A, A' | A, N |
| 'N, any, any, any' or 'A, D/N, any, any except for A, D, D, D' | N, N |

FIG. 23
(Table 15)

| HARQ-ACK(0), HARQ-ACK(1), HARQ-ACK(2) | Mapped state |
|---|---|
| ACK, ACK, ACK | ACK, ACK |
| ACK, ACK, NACK/DTX | NACK/DTX, ACK |
| ACK, NACK/DTX, any | ACK, NACK/DTX |
| NACK/DTX, any, any | NACK/DTX, NACK/DTX |

FIG. 24
(Table 16)

FIG. 25
(Table 17)

| PCC b0 | PCC/SCC b1 | SCC b2 | SCC b3 |
|---|---|---|---|
| D | N/D | N/D | N/D |
| N | N/D | N/D | N/D |
| A | N/D | N/D | N/D |
| N/D | A | N/D | N/D |
| A | A | N/D | N/D |
| N/D | N/D | A | N/D |
| A | N/D | A | N/D |
| N/D | A | A | N/D |
| A | A | A | N/D |
| N/D | N/D | N/D | A |
| A | N/D | N/D | A |
| N/D | A | N/D | A |
| A | A | N/D | A |
| N/D | N/D | A | A |
| A | N/D | A | A |
| N/D | A | A | A |
| A | A | A | A |

| PUCCH A/N resource (h#) RA & Data | Data Constant |
|---|---|
| DTX | |
| h0 | 1 |
| h0 | -1 |
| h1 | -1 |
| h1 | 1 |
| h2 | 1 |
| h2 | -1 |
| h2 | -1 |
| h3 | 1 |
| h0 | 1 |
| h3 | -1 |
| h0 | 1 |
| h3 | -1 |
| h3 | 1 |
| h1 | 1 |
| h1 | -1 |

1 bit / 2 bit / 3 bit / 4 bit

| Index | $M_1=2$ | $M_2=3$ or $M_1=3$ | $M_2=4$ |
|---|---|---|---|
| | HARQ-ACK(0), HARQ-ACK(1) | HARQ-ACK(0), HARQ-ACK(1), HARQ-ACK(2) | HARQ-ACK(0), HARQ-ACK(1), HARQ-ACK(2), HARQ-ACK(3) |
| 0 | ACK, NACK/DTX → | ACK, NACK/DTX, any → | ACK, DTX,DTX,DTX |
| 1 | NACK/DTX, ACK → | ACK,ACK, NACK/DTX → | ACK,ACK, NACK/DTX, any |
| 2 | ACK,ACK → | ACK,ACK,ACK → | ACK,ACK,ACK, NACK/DTX |
| 3 | DTX,DTX/NACK → | DTX, any, any → | DTX, any, any, any |
| 4 | NACK,NACK/DTX → | NACK/DTX, any, any → | N, any, any, any |

Sharing the same mapped PUCCH state after channel selection

FIG. 26
(Table 18)

HYBRID AUTOMATIC REPEAT REQUEST (HARQ) MAPPING FOR CARRIER AGGREGATION (CA)

RELATED APPLICATIONS

This application claims the benefit of and hereby incorporates by reference U.S. Provisional Patent Application Ser. No. 61/707,784, filed Sep. 28, 2012.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD). Time-division duplexing (TDD) is an application of time-division multiplexing (TDM) to separate downlink and uplink signals (or separate signals to a UE or from the UE in D2D communication). In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as subchannels in one communication channel, but are physically transmitted on different resources. In frequency-division duplexing (FDD), an uplink transmission and a downlink transmission (or a transmission to and from a UE in D2D communication) can operate using different frequency carriers (i.e. separate carrier frequency for each transmission direction). In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 (i.e., Table 4) illustrates a table of an UpLink-DownLink (UL-DL) configuration number of Physical Downlink Shared CHannel (PDSCH) Hybrid Automatic Retransmission re-Quest-ACKnowledge (HARQ-ACK) timing reference for a Secondary Cell (SCell) in accordance with an example;

FIG. 8 (i.e., Table 5) illustrates a table of an impact by using the M=max $(M_P, M_S)$ resource allocations (RA) solution in case when semi-persistent scheduling (SPS) is configured in accordance with an example;

FIG. 9A illustrates hybrid automatic repeat request-acknowledgement (HARQ-ACK) bundling windows for a Primary Cell (PCell) bundling window size $M_P=2$ and a Secondary Cell (SCell) bundling window size $M_S=4$ for inter-band time division duplex (TDD) carrier aggregation (CA) in accordance with an example;

FIG. 9B illustrates hybrid automatic repeat request-acknowledgement (HARQ-ACK) bundling windows for a Primary Cell (PCell) bundling window size $M_P=2$ and a Secondary Cell (SCell) bundling window size $M_S=3$ for inter-band time division duplex (TDD) carrier aggregation (CA) in accordance with an example;

FIG. 9C illustrates hybrid automatic repeat request-acknowledgement (HARQ-ACK) bundling windows for a Primary Cell (PCell) bundling window size $M_P=4$ and a Secondary Cell (SCell) bundling window size $M_S=2$ for inter-band time division duplex (TDD) carrier aggregation (CA) in accordance with an example;

FIG. 10 (i.e., Table 6) illustrates a table of a physical uplink control channel (PUCCH) resource value according to acknowledgement (ACK)/negative ACK (ACK/NACK) Resource Indicator (ARI) for downlink semi-persistent scheduling (SPS) (i.e., 3GPP LTE standard Release 11 Technical Specification (TS) 36.213 Table 9.2-2) in accordance with an example;

FIG. 15 (i.e., Table 7) illustrates a table of a transmission of hybrid automatic repeat request-acknowledgement (HARQ-ACK) multiplexing for a bundling window size of M=2 (i.e., 3GPP LTE standard Release 11 Technical Specification (TS) 36.213 Table 10.1.3-2) in accordance with an example;

FIG. 16 (i.e., Table 8) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3-3) in accordance with an example;

FIG. 17 (i.e., Table 9) illustrates a table of a transmission of hybrid automatic repeat request-acknowledgement (HARQ-ACK) multiplexing for a bundling window size of M=4 (i.e., 3GPP LTE standard Release 11 Technical Specification (TS) 36.213 Table 10.1.3-4) in accordance with an example;

FIG. 18 (i.e., Table 10) illustrates a table of a transmission of hybrid automatic repeat request-acknowledgement (HARQ-ACK) multiplexing for a bundling window size of M=2 (i.e., 3GPP LTE standard Release 11 Technical Specification (TS) 36.213 Table 10.1.3-5) in accordance with an example;

FIG. 19 (i.e., Table 11) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3-6) in accordance with an example;

FIG. 20 (i.e., Table 12) illustrates a table of a transmission of hybrid automatic repeat request-acknowledgement (HARQ-ACK) multiplexing for a bundling window size of M=4 (i.e., 3GPP LTE standard Release 11 Technical Specification (TS) 36.213 Table 10.1.3-7) in accordance with an example;

FIG. 21 (i.e., Table 13) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3.2-5) in accordance with an example; and FIG. 22 (i.e., Table 14) illustrates a table of a transmission of hybrid automatic repeat request-acknowledgement (HARQ-ACK) multiplexing for a bundling window size of M=3 (i.e., 3GPP LTE standard Release 11 Technical Specification (TS) 36.213 Table 10.1.3.2-6) in accordance with an example;

FIG. 23 (i.e., Table 15) illustrates a table of a transmission of hybrid automatic repeat request-acknowledgement (HARQ-ACK) multiplexing for a bundling window size of M=4 in accordance with an example;

FIG. 24 (i.e., Table 16) illustrates a table of a transmission of hybrid automatic repeat request-acknowledgement (HARQ-ACK) multiplexing for a bundling window size of M=3 in accordance with an example; and FIG. 25 (i.e., Table 17) illustrates a table of a hybrid automatic repeat request-acknowledgement (HARQ-ACK) mapping table for physical uplink control channel (PUCCH) format 1b with channel selection (CS) in accordance with an example.

FIG. 26 (i.e., Table 18) illustrates a table of a hybrid automatic repeat request-acknowledgement (HARQ-ACK) look-up mapping table for different uplink-downlink (UL-DL) configurations of inter-band time division duplex (TDD) carrier aggregation (CA) in accordance with an example;

Figure 1:
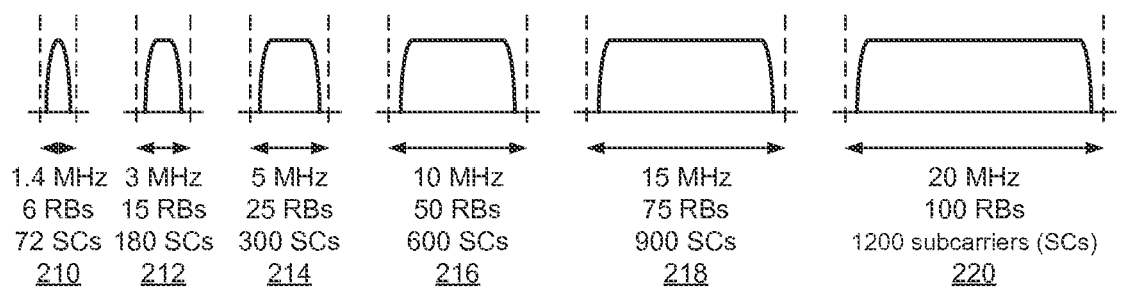
FIG. 1 illustrates a block diagram of various component carrier (CC) bandwidths in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An increase in the amount of wireless data transmission has created congestion in wireless networks using licensed spectrum to provide wireless communication services for wireless devices, such as smart phones and tablet devices. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device (e.g., UE). In carrier aggregation (CA) multiple component carriers (CC) can be aggregated and jointly used for transmission to/from a single terminal. Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains.

FIG. 1 illustrates a carrier bandwidth, signal bandwidth, or a component carrier (CC) that can be used by the wireless device. For example, the LTE CC bandwidths can include: 1.4 MHz 210, 3 MHz 212, 5 MHz 214, 10 MHz 216, 15 MHz 218, and 20 MHz 220. The 1.4 MHz CC can include 6 resource blocks (RBs) comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Carrier aggregation (CA) enables multiple carrier signals to be simultaneously communicated between a user's wireless device and a node. Multiple different carriers can be used. In some instances, the carriers may be from different permitted frequency domains. Carrier aggregation provides a broader choice to the wireless devices, enabling more bandwidth to be obtained. The greater bandwidth can be used to communicate bandwidth intensive operations, such as streaming video or communicating large data files.

Figure 2A:
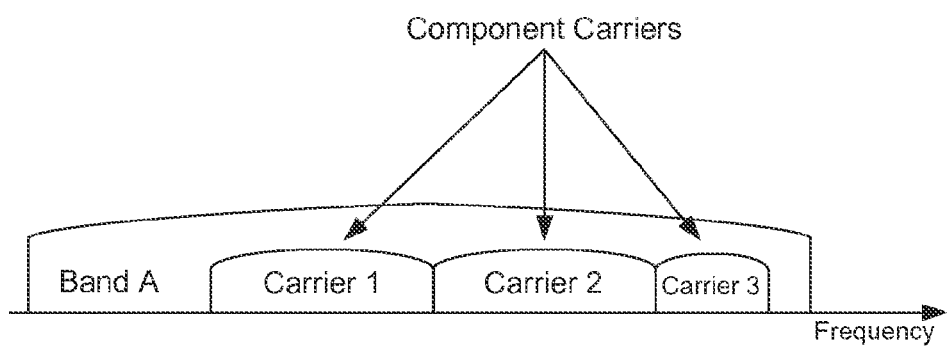
FIG. 2A illustrates a block diagram of multiple contiguous component carriers in accordance with an example.

FIG. 2A illustrates an example of carrier aggregation of continuous carriers. In the example, three carriers are contiguously located along a frequency band. Each carrier can be referred to as a component carrier. In a continuous type of system, the component carriers are located adjacent one another and can be typically located within a single frequency band (e.g., band A). A frequency band can be a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band. In contiguous carrier aggregation, only one fast Fourier transform (FFT) module and/or one radio frontend may be used. The contiguous component carriers can have similar propagation characteristics which can utilize similar reports and/or processing modules.

Figure 2B:
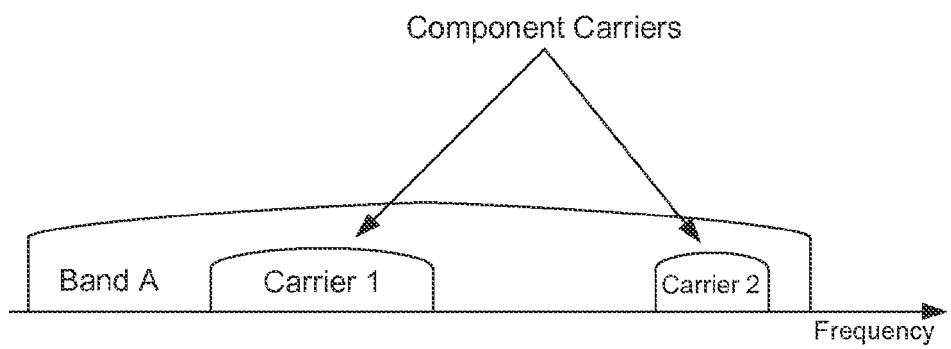
FIG. 2B illustrates a block diagram of intra-band non-contiguous component carriers in accordance with an example.
Figure 2C:
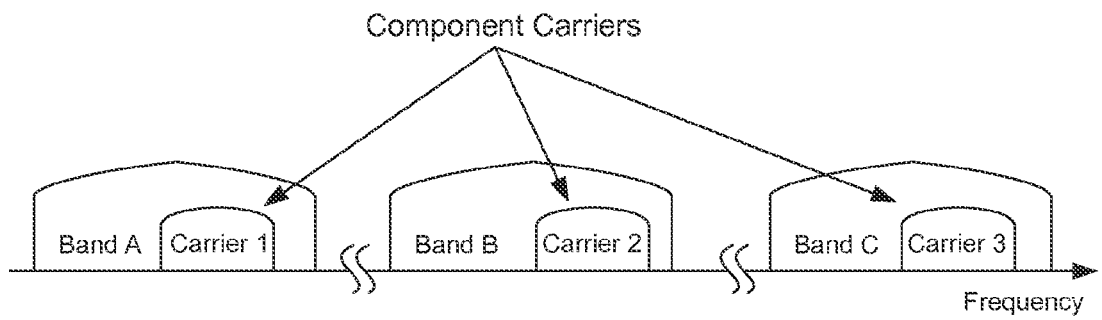
FIG. 2C illustrates a block diagram of inter-band non-contiguous component carriers in accordance with an example.

FIGS. 2B-2C illustrates an example of carrier aggregation of non-continuous component carriers. The non-continuous component carriers may be separated along the frequency range. Each component carrier may even be located in different frequency bands. Non-contiguous carrier aggregation can provide aggregation of a fragmented spectrum. Intra-band (or single-band) non-contiguous carrier aggregation provides non-contiguous carrier aggregation within a same frequency band (e.g., band A), as illustrated in FIG. 2B. Inter-band (or multi-band) non-contiguous carrier aggregation provides non-contiguous carrier aggregation within different frequency bands (e.g., bands A, B, or C), as illustrated in FIG. 2C. The ability to use component carriers in different frequency bands can enable more efficient use of available bandwidth and increases the aggregated data throughput.

Figure 3A:
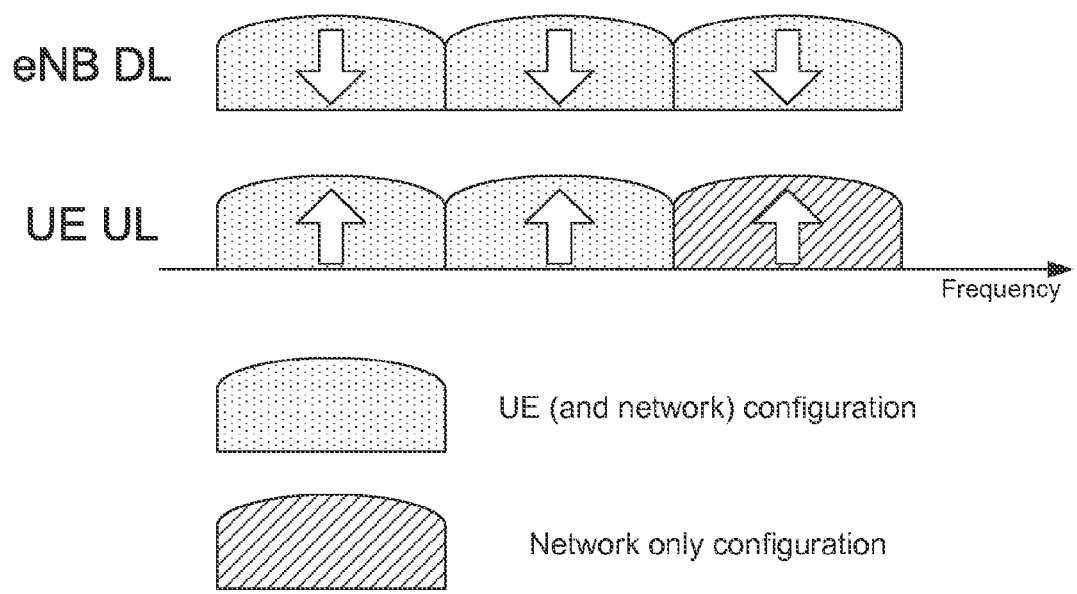
FIG. 3A illustrates a block diagram of a symmetric-asymmetric carrier aggregation configuration in accordance with an example.
Figure 3B:
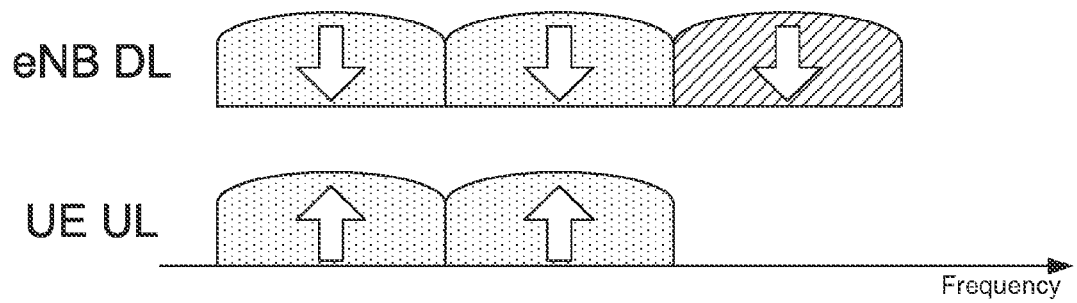
FIG. 3B illustrates a block diagram of an asymmetric-symmetric carrier aggregation configuration in accordance with an example.

Network symmetric (or asymmetric) carrier aggregation can be defined by a number of downlink (DL) and uplink (UL) component carriers offered by a network in a sector. UE symmetric (or asymmetric) carrier aggregation can be defined by a number of downlink (DL) and uplink (UL) component carriers configured for a UE. The number of DL CCs may be at least the number of UL CCs. A system information block type 2 (SIB2) can provide specific linking between the DL and the UL. FIG. 3A illustrates a block diagram of a symmetric-asymmetric carrier aggregation configuration, where the carrier aggregation is symmetric between the DL and UL for the network and asymmetric between the DL and UL for the UE. FIG. 3B illustrates a block diagram of an asymmetric-symmetric carrier aggregation configuration, where the carrier aggregation is asymmetric between the DL and UL for the network and symmetric between the DL and UL for the UE.

For each UE, a CC can be defined as a primary cell (PCell). Different UEs may not necessarily use a same CC as their PCell. The PCell can be regarded as an anchor carrier for the UE and the PCell can thus be used for control signaling functionalities, such as radio link failure monitoring, hybrid automatic repeat request-acknowledgement (HARQ-ACK), and PUCCH resource allocations (RA). If more than one CC is configured for a UE, the additional CCs can be denoted as secondary cells (SCells) for the UE.

Figure 4:
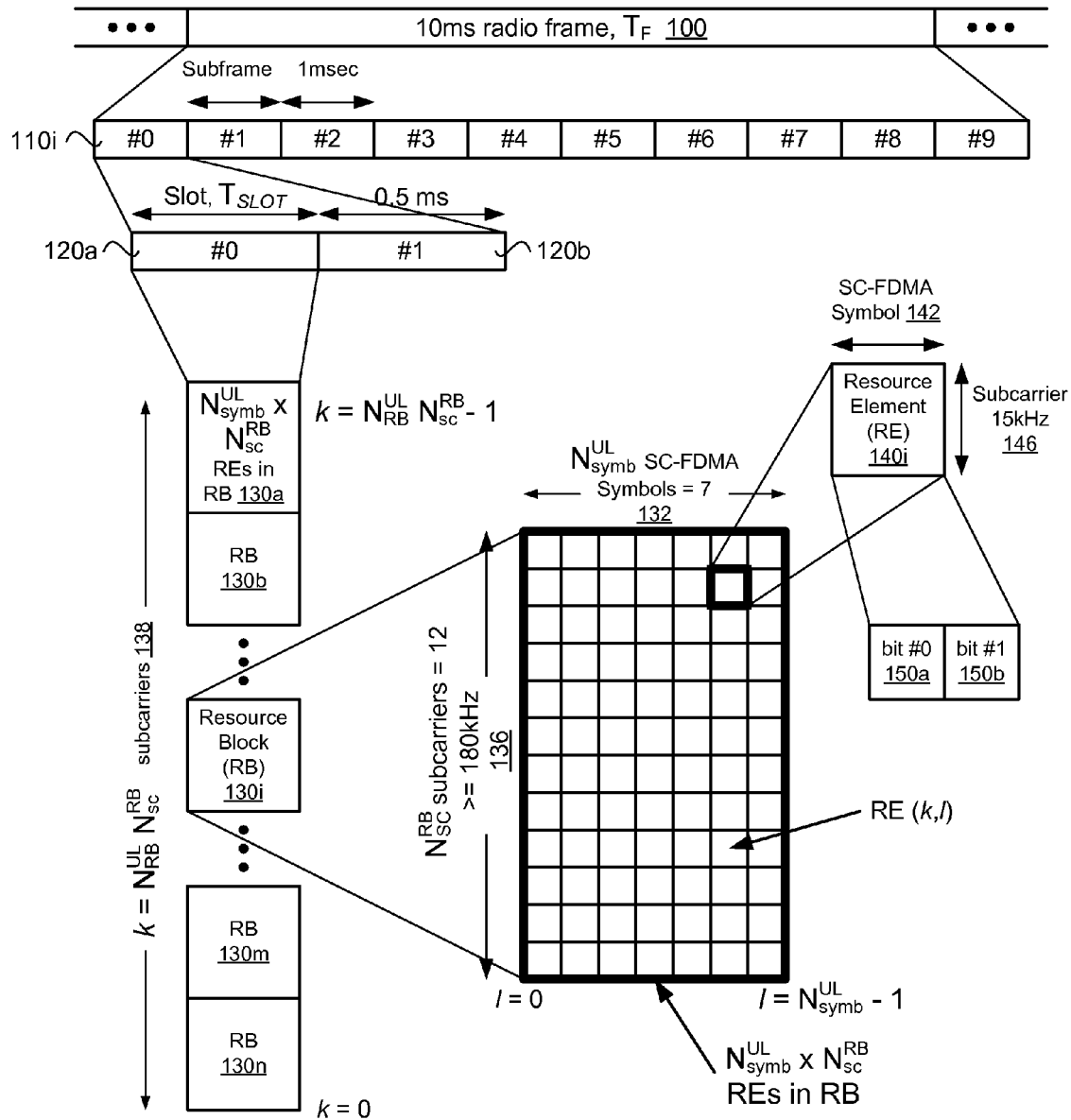
FIG. 4 illustrates a block diagram of uplink radio frame resources (e.g., a resource grid) in accordance with an example.

A component carrier can be used to carry channel information via a radio frame structure transmitted on the physical (PHY) layer in a uplink transmission between a node (e.g., eNodeB) and the wireless device (e.g., UE) using a generic long term evolution (LTE) frame structure, as illustrated in FIG. 4. While an LTE frame structure is illustrated, a frame structure for an IEEE 802.16 standard (WiMax), an IEEE 802.11 standard (WiFi), or another type of communication standard using SC-FDMA or OFDMA may also be used.

FIG. 4 illustrates an uplink radio frame structure. A similar structure can be used for a downlink radio frame structure using OFDMA. In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130$a$, 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one SC-FDMA symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

An uplink signal or channel can include data on a Physical Uplink Shared CHannel (PUSCH) or control information on a Physical Uplink Control CHannel (PUCCH). In LTE, the uplink physical channel (PUCCH) carrying uplink control information (UCI) can include channel state information (CSI) reports, Hybrid Automatic Retransmission reQuest (HARQ) ACKnowledgment/Negative ACKnowledgment (ACK/NACK) and uplink scheduling requests (SR).

The wireless device (e.g., UE) can provide HARQ-ACK feedback for a PDSCH using a PUCCH. The PUCCH can support multiple formats (i.e., PUCCH format) with various modulation and coding schemes (MCS), as shown for LTE in Table 1. Similar information to Table 1 can be shown in 3GPP LTE standard Release 11 (e.g., V11.1.0 (2012-12)) Technical Specification (TS) 36.211 Table 5.4-1. For example, PUCCH format 1b can be used to convey a two-bit HARQ-ACK, which can be used for carrier aggregation.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Legacy LTE TDD can support asymmetric UL-DL allocations by providing seven different semi-statically configured uplink-downlink configurations. Table 2 illustrates seven UL-DL configurations used in LTE, where "D" represents a downlink subframe, "S" represents a special subframe, and "U" represents an uplink subframe. In an example, the special subframe can operate or be treated as a downlink subframe. Similar information to Table 2 can be shown in 3GPP LTE TS 36.211 Table 4.2-2.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 2, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, and 3-9. Each uplink subframe n can be associated with a downlink subframe based on the uplink-downlink configuration, where each uplink subframe n can have a downlink association set index $K \in \{k_0, k_1, \ldots k_{m-1}\}$ where M is defined as the number of elements in set K, as illustrated by Table 3. Similar information to Table 3 can be shown in 3GPP LTE TS 36.213 Table 10.1.3.1-1.

The Table 3 shows examples of downlink subframe bundling in an uplink subframe handling ACK/NACK feedback for certain downlink subframe(s). For example, in uplink-downlink configuration 4, uplink subframe 2 (subframe n) handles ACK/NACK feedback for downlink and special subframes which are {12, 8, 7, 11} subframes (subframes $k_m$) earlier than uplink subframe 2 (i.e., downlink and special subframes {0, 4, 5, 1} (or downlink and special subframes $n-k_m$)) and M equals 4. Uplink subframe 3 (subframe n) handles ACK/NACK feedback for downlink subframes which are {6, 5, 4, 7} subframes (subframes $k_m$) earlier than uplink subframe 3 (i.e., downlink subframes {7, 8, 9, 6} (or downlink subframes $n-k_m$)) and M equals 4. For uplink-downlink configuration 5 uplink subframe 2, M equals 9. For uplink-downlink configuration 0, uplink subframe 2, M equals one, and uplink subframe 3, M equals zero. Depending on the uplink-downlink configuration one uplink subframe may be responsible for ACK/NACK feedback for one or multiple downlink subframes. In certain situations, even distribution between uplink subframe responsibility can be desired to reduce situations where one uplink subframe is responsible for ACK/NACK feedback for a large number of downlink and special subframes.

As an underlying requirement in some examples, cells of the network can change UL-DL (TDD) configurations synchronously in order to avoid the interference. However, such a requirement can constrain the traffic management capabilities in different cells of the network. The legacy LTE TDD set of configurations can provide DL subframe allocations in the range between 40% and 90%, as shown in Table 2. The UL and DL subframes allocation within a radio frame can be reconfigured through system information broadcast signaling (e.g., system information block [SIB]). Hence, the UL-DL allocation once configured can be expected to vary semi-statically.

A property of TDD is that a number of UL and DL subframes can be different as shown in Table 2 and often the number of DL subframes can be more than the number of UL subframes for a radio frame. In configurations where more DL subframes are used than UL subframes, multiple DL subframes can be associated with one single UL subframe for the transmission of a corresponding control signals. A configuration-specific HARQ-ACK timing relationship can be defined (e.g., 3GPP LTE standard Release 11 (e.g., V11.1.0 (2012-12)) TS 36.213 Table 10.1.3.1-1 or Table 3). If a UE is scheduled in a multiple of DL subframes, which can be associated with one UL subframe, the UE can transmit multiple ACK/NAK (ACK/NACK) bits in that UL subframe. A number of DL subframes with HARQ-ACK feedback on one single UL subframe can comprise one bundling window.

Figure 6:
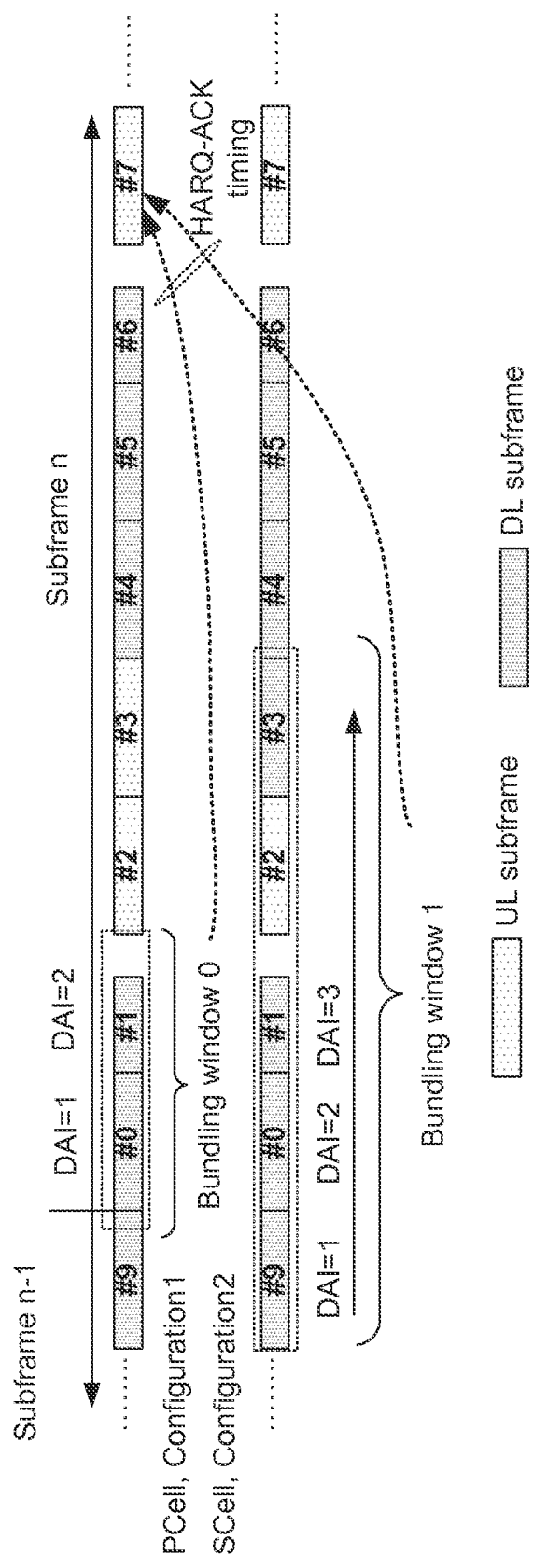
FIG. 6 illustrates different hybrid automatic repeat request-acknowledgement (HARQ-ACK) bundling windows for a Primary Cell (PCell) and a Secondary Cell (SCell) for inter-band time division duplex (TDD) carrier aggregation (CA) (e.g., different UL-DL configurations) in accordance with an example.

As shown in FIG. 6, the subframe 0 and 1 can comprise one bundling window on a PCell according a predefined

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

HARQ-ACK timing relation for UL-DL configuration 1, while correspondingly, subframe 9 of previous radio frame, subframe 0, 1 and 3 comprise the HARQ-ACK bundling window on a SCell according to the HARQ-ACK timing defined for configuration 2 for uplink subframe 7. In an example, HARQ-ACK bundling window may not be used for configuration 5, with 9 DL subframes.

An advantage of a Time Division Duplex (TDD) system can be a flexible resource utilization through different TDD configurations to better match the uplink and downlink traffic characteristics of the cell. By configuring different TDD configurations, the ratio between available UpLink (UL) and DownLink (DL) resources can range from 3UL: 2DL (6UL:4DL) to 1 UL:9DL. In legacy LTE TDD (e.g., LTE Release 10 (Rel-10) specification), only the aggregation of TDD Component Carriers (CCs) of a same UL-DL configuration may be defined and supported. While the same UL-DL configuration can simplify a design and operation of CC, the same UL-DL configuration can also impose some limitations.

In an example, inter-band carrier aggregation (CA) for a TDD system with different uplink-downlink configurations on different bands can be supported. For instance, more than one TDD carrier can be deployed by a single TDD operator and the carriers can be aggregated at a single base station (e.g., node). Besides, a separation between two carrier frequencies can be large enough to avoid UL-DL interference from a same device. Some of the benefits of inter-band CA with different TDD configurations on different bands can be include (1) legacy system co-existence, (2) heterogeneous network (HetNet) support, (3) aggregation of traffic-dependent carriers, (4) flexible configuration (e.g., more UL subframe in lower bands for better coverage, and more DL subframes in higher bands), and (5) higher peak rate.

Supporting Inter-band TDD Carrier Aggregation (CA) with different uplink-downlink configurations can be used to aggregate component carriers (CC) with different DL/UL configurations. To provide high peak data rate enhancement benefits to both full- and half-duplex UEs, HARQ (Hybrid Automatic Repeat reQuest) ACK/NACK feedback for downlink (DL) data may use a PUCCH only transmitted on Primary Cell (PCell), use legacy HARQ-ACK timing for PCell PDSCH by following a PCell SIB type 1 (SIB1) UL-DL configuration, and use HARQ-ACK timing for the PDSCH of a Secondary Cell (SCell) following a specific reference UL-DL configuration (e.g., PCell and SCell UL-DL configuration) as shown in Table 4 illustrated in FIG. 5. For example, HARQ-ACK timing of the PDSCH on the PCell can follow the PCell SIB1 legacy UL/DL configuration. For the PDSCH transmitted on the SCell, the HARQ timing can follow reference legacy UL/DL configuration as shown in Table 4.

Interband TDD CA with different UL-DL configurations in different bands can be supported. For example, an SCell PDSCH HARQ reference timing can be determined from a PCell UL-DL configuration and a SCell UL-DL configuration, as shown in Table 4 illustrated in FIG. 5. Table 4 (i.e., FIG. 5) illustrates the UL-DL configuration number of PDSCH HARQ-ACK timing reference for SCell. A HARQ-ACK timing of PCell PDSCH, the scheduling timing of PCell PUSCH, the HARQ timing of PCell PUSCH can use the PCell SIB1 configuration. A UE can be configured with PUCCH format 3 or PUCCH format 1b with channel selection (CS) for HARQ-ACK transmission and self-carrier scheduling for TDD inter-band carrier aggregation (CA) with different UL-DL configurations on different bands.

A different number of downlink subframes can be bundled within an individual bundling window of each serving cell (e.g., PCell or SCell) as shown in FIG. 6. According to the HARQ-ACK timing table (i.e., Table 4) for the SCell PDSCH, the size of HARQ-ACK bundling window can be different between PCell and SCell. FIG. 6 illustrates an example where the PCell is configured with TDD UL/DL configuration 1 and SCell is configured with TDD UL/DL configuration 2. Since the SCell can follow a different DL HARQ timing from the PCell, not only the bundling window of the SCell can be different from the PCell, but also the number of the HARQ-ACK bits (corresponding to the number of the DL subframes) in the SCell bundling window can be different from the PCell bundling window. As a result, legacy HARQ-ACK bit mapping and bundling rules may no longer applicable for a SCell UL-DL configuration with a different UL-DL configuration from the PCell or legacy HARQ-ACK bit mapping and bundling rules may no longer support a case with the SCell UL-DL configuration different from the PCell UL-DL configuration.

FIG. 6 illustrates varied HARQ-ACK bundling window sizes of the PCell and the SCell in case of inter-band TDD CA. An implication of different UL-DL configurations can be that different number of downlink subframes can be bundled within bundling window in each cell. For example, as shown in FIG. 6, a PCell can use TDD configuration 1 and an SCell can use a TDD configuration 2. As illustrated, the size of bundling windows associated with the UL subframe 7 can be different for the two serving cells (e.g., PCell and SCell). For the PCell, the HARQ-ACK bundling window size is 2 comprising subframe {0,1}, while for SCell, the HARQ-ACK bundling window size is 4 comprising subframe {9,0,1,3 }, as shown in FIG. 6. FIG. 6 illustrates different HARQ-ACK bundling windows in a TDD inter-band CA scenario.

A UE can be configured with PUCCH format 3 or PUCCH format 1b with channel selection (CS) for HARQ-ACK transmission and self-carrier scheduling for TDD inter-band carrier aggregation (CA) with different UL-DL configurations on different bands. Various changes can be made to a legacy HARQ-ACK transmission configuration. For example, none of the PDSCH timing reference configurations of aggregated serving cells may be UL-DL configuration #5. The set of DL subframes (denoted as Kc) on serving cell c associated with UL subframe n can include the DL subframes n−k where k∈K and K is determined according to the TDD UL-DL configuration which the PDSCH HARQ timing on serving cell c follows. For HARQ-ACK transmission on PUCCH (at least for a case when Mp and Ms are positive), the UE can use legacy mapping table (e.g., Tables 7-14 illustrated in FIGS. 15-22) with M=max{Mp, Ms}, where Mp is the number of elements in set Kc for the primary cell and Ms is the number of elements in set Kc for the secondary cell, or the UE can set a discontinuous transmission (DTX) for {HARQ-ACK(min{Mp, Ms}), . . . , HARQ-ACK(M−1)} for the serving cell with the smaller Mc value. Setting the DTX for {HARQ-ACK (min{Mp, Ms}), . . . , HARQ-ACK(M−1)} for the serving cell with the smaller Mc value is shown in Table 18 illustrated in FIG. 26 and shown and described in U.S. Provisional Patent Application Ser. No. 61/653,369, filed May 30, 2012; U.S. patent application Ser. No. 13/853,390 to Hong He, et al., entitled "HYBRID AUTOMATIC REPEAT REQUEST (HARQ) MAPPING FOR CARRIER AGGREGATION (CA)", filed Mar. 29, 2013, U.S. Provisional Patent Application Ser. No. 61/667,325, filed Jul. 2, 2012; and U.S. patent application Ser. No. 13/853,404 to Hong He, et al., entitled "HYBRID AUTOMATIC REPEAT REQUEST (HARQ) MAPPING FOR CARRIER AGGREGATION (CA)", filed Mar. 29, 2013, each of which are herein incorporated by reference in their entirety.

In another example, the UE can handle overlapping states, where an overlapping state includes an acknowledgement (ACK), Negative ACK (NACK), or discontinuous transmission (DTX) response (i.e., ACK/NACK/DTX response) that can map to a HARQ-ACK state shared by another ACK/NACK/DTX response. For example, a ACK/NACK/DTX response (in an overlapping state) may not have a unique HARQ-ACK state that can be decoded by a node (e.g., eNB) to a known ACK/NACK/DTX response. For instance, a overlapping HARQ-ACK state can define a plurality of ACK/NACK/DTX responses (e.g., at least two ACK/NACK/DTX responses). HARQ-ACK states can be specified, defined, re-mapped, or generated to avoid overlapping states.

For example, an overlapping states issue can be described for Mp(=2)<Ms(=4) after padding the additional state with 'DTX', where Mp represents a HARQ bundling window size for the PCell and Ms represents a HARQ bundling window size for the SCell. The UE generate a same mapped state "N, N" for HARQ feedback except for an actual decoding result "ACK, ACK" within the PCell's bundling window Mp since both of HARQ-ACK state "ACK, NACK, DTX, DTX" and "NACK, any, DTX, DTX" can be mapped to the same state according to a legacy "M=4" mapping table (e.g., Tables 9 or 12 illustrated in FIG. 17 or 20). For instance, padding additional HARQ-ACK states with 'DTX' can result in the HARQ-ACK state being unknown at eNB side and can consequently cause a downlink (DL) throughput degradation.

A solution to alleviate a HARQ-ACK state being unknown at the node can be used to enable carrier aggregation (CA) functionality when PUCCH format 1b with CS is configured for a CA scenario. For example, the UE can determine a bundling window size for M in carrier aggregation by max(Mp, Ms). For a serving cell (e.g., PCell or SCell) with a smaller bundling window size, a predetermined state (e.g. DTX) can be padded by "max(Mp,Ms)−min(Mp,Ms)" with exception of some known states. For example, in case of min(Mp,Ms)=2 and max(Mp,Ms)=4, the state of "ACK,NACK" for the serving cell with min(Mp, Ms)=2 can be mapped to "ACK,DTX,DTX,DTX" for the legacy mapping table (e.g., Tables 9, 12, or 14 illustrated in FIG. 17, 20, or 22). In case of min(Mp,Ms)=2 and max(Mp, Ms)=4, the state of "NACK,ACK" for the serving cell with min(Mp,Ms)=2 can be mapped to "ACK,ACK,ACK, NACK/DTX" for the legacy mapping table (e.g., Tables 9, 12, or 14 illustrated in FIG. 17, 20, or 22). In case of min(Mp,Ms)=2 and max(Mp,Ms)=3, the state of "NACK, ACK" for the serving cell with min(Mp,Ms)=2 can be mapped to "ACK,ACK,ACK" for the legacy mapping table (e.g., Tables 8, 11, or 13 illustrated in FIG. 16, 19, or 21). In case of min{Mp,Ms}=3 and max{Mp,Ms}=4, the state of "ACK,NACK, any" for the serving cell with min{Mp, Ms}=3 can be mapped to "ACK,DTX,DTX,DTX" for the legacy mapping table (e.g., Tables 9, 12, or 14 illustrated in FIG. 17, 20, or 22).

The solution described can address the HARQ-ACK overlapping states issue, but may not provide a complete solution because other relevant issues (e.g., semi-persistence scheduling (SPS)) on mapping a corresponding PUCCH channel resources to support a HARQ-ACK feedback scheme for CA using DTX padding may provide an ambiguity or inefficiency. Taking into account that different PUCCH resources allocation (RA) schemes can be independently applied for M=2 case (e.g. DL subframe index based RA) and M=3 or 4 cases (e.g. downlink assignment index-based (DAI-based) RA), a complete solution can be used to address SPS subframes and non-SPS subframes.

A predefined RA for a max(Mp,Ms) case, that is a DAI based RA scheme, can have a common RA scheme for both CCs to reduce a specification or implementation complexity. However, a scenario where one of the DL subframes in the smaller bundling window MP is configured with semi-persistence scheduling (SPS) (e.g. Voice over Internet Protocol (VoIP)) may not be addressed by the described solution. An overriding process for SPS can be used to override a SPS. For instance, after enabling SPS, the UE can continue to monitor the PDCCH for dynamic uplink and downlink scheduling commands (not normally sent for SPS).

In a case where a dynamic scheduling is detected, the UE can override the semi-persistence scheduling (SPS) in the particular subframe wherein dynamic scheduling was detected, which can be useful when the SPS allocated resources are occasionally increased (e.g., for VoIP in parallel with web browsing). Moreover, for TDD HARQ-ACK multiplexing with PUCCH format 1b with CS and two configured serving cells with M=3 or 4, when SPS exists in the bundling window, HARQ(0) or HARQ-ACK(0) in a legacy table (e.g., Tables 7-14 illustrated in FIGS. 15-22) can represent the SPS ACK/NAK, and HARQ(i) or HARQ-ACK(i) can represent HARQ-ACK for the PDSCH with DL grant DAI=i; otherwise, HARQ(i) can represent the HARQ-ACK for the PDSCH with DL grant DAI=i+1.

Figure 7:
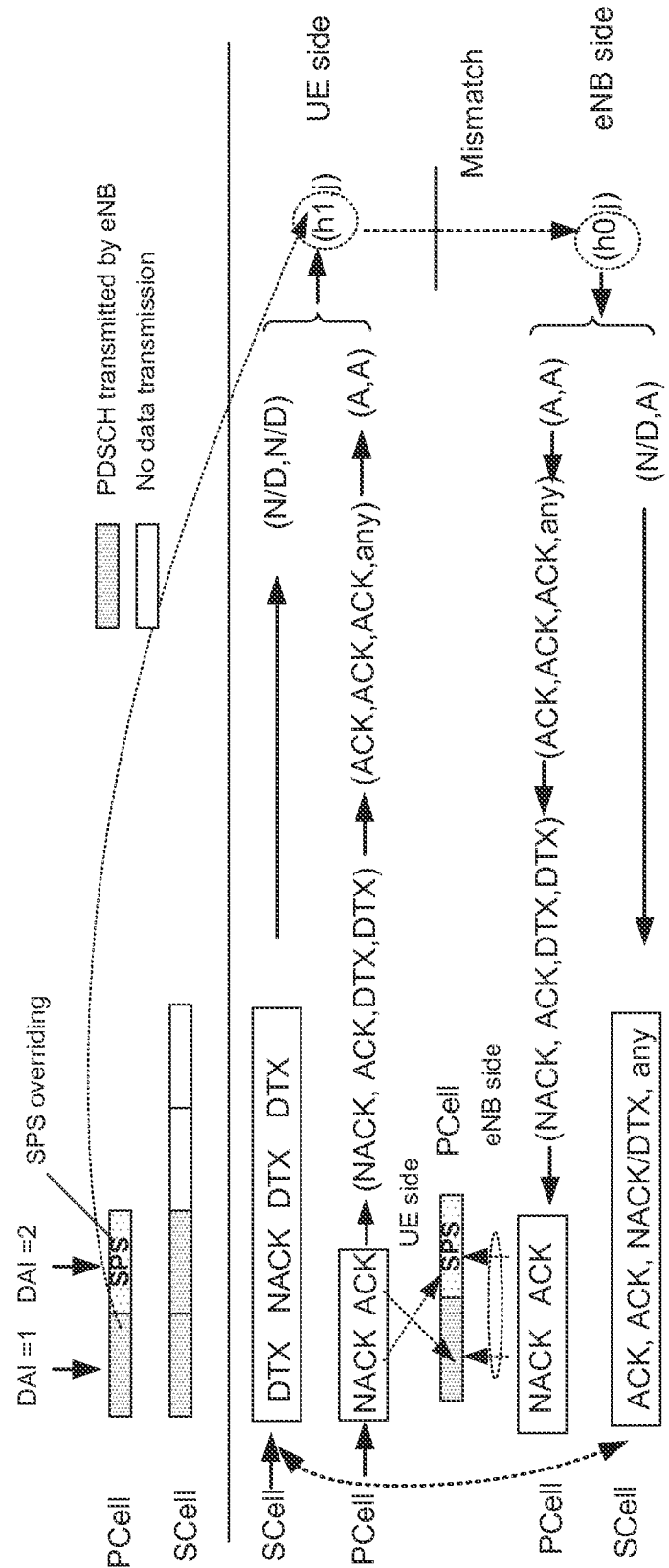
FIG. 7 illustrates a potential issue by reusing a M=max $(M_P, M_S)$ resource allocations (RA) solution when semi-persistent scheduling (SPS) is configured in accordance with an example.

For PUCCH format 1b with CS, a mismatch of DL data reception status can occur between the UE and node (e.g., eNB) when a misdetection of the dynamic downlink control information (DCI) that overrides the SPS configuration occurs at the UE side. The misdetection of the SPS override can incur unnecessary retransmission or lost packets and DL throughput performance degradation, which can be more pronounced with CA using different UL-DL configurations. FIG. 7 and Table 5 (i.e., FIG. 8) illustrates an effect of misdetection of the SPS override Mp=2 (e.g., configuration 1) on PCell and Ms=4 (e.g., configuration 2) on SCell. FIG. 7 illustrates a potential issue by reusing a M=max (M$_P$,M$_S$) resource allocations (RA) solution when semi-persistent scheduling (SPS). As shown in FIG. 7, four DL subframes are transmitted on PCell and SCell. For PCell, dynamic DCI can be transmitted by the eNB to override the SPS configuration in the SPS subframe, which can be misdetected by the UE and the actual HARQ-ACK status can be assumed as (NACK, ACK, DTX, DTX). For illustration purposes, the status 'NACK' can denote the HARQ-ACK response for the SPS subframe and 'ACK' can denote the HARQ-ACK response for a first DL subframe in the bundling window on PCell.

Because the UE may not know the dynamic DCI overriding SPS is sent on PCell due to misdetection, the UE can feed back HARQ-ACK assuming an existence of the SPS subframe within the bundling window. Moreover, the PDSCH reception status at the UE can be assumed to be (DTX, NACK, DTX, DTX) for SCell. Then (h1, j) can be used by the UE for the HARQ-ACK feedback according to the M=max (Mp,Ms) legacy mapping table (e.g., Table 14 illustrated in FIG. 22), where h1 represents PUCCH resource $n_{PUCCH,1}^{(1)}$ and 'j' represents the HARQ-ACK state. Under the hypothesis that eNB detects the HARQ-ACK state 'j' on the corresponding PUCCH channel correctly, but, the corresponding PUCCH channel may be wrongly interpreted as 'h0' (i.e., PUCCH resource $n_{PUCCH,}$ $o^{(1)}$ at the eNB side, rather than 'h1' (actually determined by UE) because of an assumption by the eNB that the UE detected the dynamic overriding DCI on the SPS subframe. Then, following a legacy mapping table, the PDSCH reception status interpreted by eNB can be (NACK, ACK, DTX, DTX) on the PCell and (ACK,ACK,NACK/DTX, any) on the SCell as summarized in Table 5 (i.e., FIG. 8). As shown in Table 5, for some cases (e.g., the example in FIG. 7), the reception status of all of DL subframes (e.g., 100%) can be incorrectly interpreted at the eNB, which can incur significant DL performance degradation and unacceptable packet loss rate due to an interpretation event of (NACK->ACK).

Thus, directly reusing the RA method for M=max (Mp, Ms) in a legacy design for an overlapping states solution may not be feasible and can be unacceptable because of significant DL throughput degradation and potential large number of packet loss that may occur when SPS is configured in smaller bundling window on PCell.

A solution can be used to address a resource allocation issue taking into account a type of DL subframes in a smaller bundling window when the smaller bundling window occurs on the PCell. A conditional HARQ-ACK states mapping and PUCCH resources allocation solution can provide a HARQ-ACK feedback method including the HARQ-ACK states generation and corresponding PUCCH resource allocation associated with HARQ-ACK states, which can support a PUCCH format 1b with channel selection scheme.

For example, different HARQ-ACK states mapping and PUCCH resource allocation (RA) schemes can be used for an inter-band CA scenario depending on one of two conditions (e.g., condition 1 (or a first condition), and condition 2 (or a second condition)).

In a first condition, (i.e., condition 1), a PDSCH transmission without a corresponding PDCCH can be detected within a bundling window (e.g., semi-persistence scheduling (SPS)). Condition 1 may not include a case that SPS PDSCH is dynamically overridden by PDCCH (i.e., SPS overriding). Some potential scenarios for the first condition are illustrated in FIGS. 9A-C. The example bundling windows combinations in FIGS. 9A-C are illustrative, and not exhaustive. The applicable range of Condition 1 is not constrained to the examples in FIGS. 9A-C. FIG. 9A illustrates HARQ-ACK bundling windows for the PCell bundling window size $M_P$=2 and the SCell bundling window size $M_S$=4 for inter-band TDD CA. FIG. 9B illustrates HARQ-ACK bundling windows for the PCell bundling window size $M_P$=2 and the SCell bundling window size $M_S$=3. FIG. 9C illustrates HARQ-ACK bundling windows for the PCell bundling window size $M_P$=4 and the SCell bundling window size $M_S$=2.

In an example, for a HARQ-ACK states generation for the PCell (i.e., condition 1), HARQ-ACK(0) can be the ACK/NACK/DTX response for the PDSCH transmission without a corresponding PDCCH. For 0≤j≤M−1, where M=max (Mp,Ms), if a PDSCH transmission with a corresponding PDCCH and DAI value in the PDCCH equal to 'j' or a PDCCH indicating downlink SPS release and with DAI value in the PDCCH equal to 'j' is received, HARQ-ACK(j) can be the corresponding ACK/NACK/DTX response; otherwise HARQ-ACK(j) can be set to DTX.

For HARQ-ACK states generation for the SCell (i.e., condition 1), for 0≤j≤M−1, where M=max (Mp,Ms), if a PDSCH transmission with a corresponding PDCCH and DAI value in the PDCCH equal to 'j+1' is received, HARQ-ACK(j) can be the corresponding ACK/NACK/DTX response; otherwise HARQ-ACK(j) can be set to DTX.

For a PUCCH RA scheme for the PCell (i.e., condition 1), the value of $n_{PUCCH,0}^{(1)}$ can be determined according to a higher layer configuration (e.g., Radio Resource Control (RRC) signaling) and Table 6 (i.e., FIG. 10). For a PDSCH transmission on the primary cell indicated by a detection of a corresponding PDCCH or a PDCCH indicating downlink SPS release in one subframe of bundling window with the DAI value in the PDCCH equal to '1', the PUCCH resource can be derived by Expression 1:

$$n_{PUCCH,i}^{(1)}=(M-m-1)\cdot N_c+m\cdot N_{c+1}+n_{CCE,m}+N_{PUCCH}^{(1)}\text{[Expression 1]},$$

where c is selected from {0, 1, 2, 3} such that:
$N_c=\max\{0,\lfloor[N_{RB}^{DL}\cdot(N_{sc}^{RB}\cdot c-4)]/36\rfloor\}$,
where $n_{CCE,m}$ is the number of the first CCE used for transmission of the corresponding PDCCH in the subframe of bundling window and $N_{PUCCH}^{(1)}$ is configured by higher layers (e.g., RRC signaling).

For a PUCCH RA scheme for the SCell (i.e., condition 1), for a PDSCH transmission on the SCell indicated by the detection of a corresponding PDCCH on the PCell in one subframe within bundling window, 2 resources for the SCell can be derived from PDCCHs having DAI=1, 2 for SCell as defined by Expression 1. For a PDSCH transmission (i.e., condition 1) indicated by the detection of a corresponding PDCCH within the subframe on the SCell, two PUCCH resources for SCell can be indicated by ARI (e.g. re-interpreting the TPC field in the DCI format of the corresponding PDCCH) as shown in Table 6 (i.e., FIG. 10).

A second condition, (i.e., condition 2) include a PDSCH transmission with a corresponding PDCCH, a PDCCH indicating downlink SPS release, or a case that SPS PDSCH is dynamically overridden by PDCCH (i.e., SPS overriding). The second condition (or otherwise) can include conditions not covered by the first condition.

In a second condition example (i.e., condition 2), for a HARQ-ACK states generation for the PCell and the SCell, for 0≤j≤M−1, where M=max (Mp,Ms), if a PDSCH transmission with a corresponding PDCCH and DAI value in the PDCCH equal to 'j+1' or a PDCCH indicating downlink SPS release and with DAI value in the PDCCH equal to 'j+1' is received, HARQ-ACK(j) can be the corresponding ACK/NACK/DTX response; otherwise HARQ-ACK(j) can be set to DTX with exception of a various specified states. For example, in case of min(Mp,Ms)=2 and max(Mp,Ms)=4, the state of "ACK,NACK" for the serving cell with min(MP,M2)=2 can be mapped to "ACK,DTX,DTX,DTX" for {HARQ-ACK(0),HARQ-ACK(1),HARQ-ACK(2), HARQ(3)}. In case of min(Mp,Ms)=2 and max(Mp,Ms)=4, the state of "NACK,ACK" for the serving cell with min (MP,M2)=2 can be mapped to "ACK,ACK,ACK,NACK/DTX" for {HARQ-ACK(0),HARQ-ACK(1),HARQ-ACK(2), HARQ(3)}. In case of min(Mp,Ms)=2 and max(Mp,Ms)=3, the state of "NACK,ACK" for the serving cell with min(MP,M2)=2 can be mapped to "ACK,ACK,ACK" for {HARQ-ACK(0),HARQ-ACK(1),HARQ-ACK(2)}. In case of min (Mp,Ms)=3 and max(Mp,Ms)=4, the state of "ACK, NACK, any" for the serving cell with min{Mp,Ms}=3 can be mapped to "ACK,DTX,DTX,DTX" for {HARQ-ACK (0),HARQ-ACK(1),HARQ-ACK(2), HARQ(3)}.

In another second condition example (i.e., condition 2), for a HARQ-ACK states generation for the PCell and the SCell, the various specified states can be alternatively defined. For example, in case of min(Mp,Ms)=2 and max (Mp,Ms)=4, the state of "ACK,NACK" for the serving cell with min(MP,M2)=2 can be mapped to "ACK,ACK,ACK, NACK/DTX" for {HARQ-ACK(0),HARQ-ACK(1), HARQ-ACK(2), HARQ(3)}. In case of min(Mp,Ms)=2 and max(Mp,Ms)=4, the state of "NACK,ACK" for the serving cell with min(MP,M2)=2 can be mapped to "ACK,DTX, DTX,DTX" for {HARQ-ACK(0),HARQ-ACK(1),HARQ-ACK(2), HARQ(3)}. In case of min(Mp,Ms)=2 and max (Mp,Ms)=3, the state of "NACK,ACK" for the serving cell with min(MP,M2)=2 can be mapped to "ACK,ACK,ACK" for {HARQ-ACK(0),HARQ-ACK(1),HARQ-ACK(2)}. In case of min (Mp,Ms)=3 and max(Mp,Ms)=4, the state of "ACK,NACK, any" for the serving cell with min{Mp, Ms}=3 can be mapped to "ACK,DTX,DTX,DTX" for {HARQ-ACK(0),HARQ-ACK(1),HARQ-ACK(2), HARQ (3)}.

For a PUCCH RA scheme for the PCell (i.e., condition 2), for a PDSCH transmission on the primary cell indicated by the detection of a corresponding PDCCH or a PDCCH indicating downlink SPS release in one subframe of bundling window with the DAI value in the PDCCH equal to either '1' or '2', the PUCCH resource can be derived by Expression 2:

$$n_{PUCCH,i}^{(1)}=(M-m-1) \cdot N_c + m \cdot N_{c+1} + n_{CCE,m} + N_{PUCCH}^{(1)} \text{ [Expression 2],}$$

where c is selected from {0, 1, 2, 3} such that $N_c \leq n_{CCE,m} < N_{c+1}$, $N_c = \max\{0, \lfloor [N_{RB}^{DL} \cdot (N_{sc}^{RB} \cdot c - 4)]/36 \rfloor\}$, where $n_{CCE,m}$ is the number of the first CCE used for transmission of the corresponding PDCCH in the subframe of the bundling window, and $N_{PUCCH}^{(1)}$ is configured by higher layers, i=0 for the corresponding PDCCH with the DAI value equal to '1' and i=1 for the corresponding PDCCH with the DAI value equal to '2'.

For a PUCCH RA scheme for the SCell (i.e., condition 1), for a PDSCH transmission on the SCell indicated by the detection of a corresponding PDCCH on the PCell in one subframe within bundling window, 2 resources for SCell can be derived from PDCCHs having DAI=1, 2 for SCell as defined by Expression 1. For a PDSCH transmission (i.e., condition 2) indicated by the detection of a corresponding PDCCH within the subframe on the SCell, two PUCCH resources for SCell can be indicated by ARI (e.g. re-interpreting the TPC field in the DCI format of the corresponding PDCCH) as defined or shown in Table 6 (i.e., FIG. 10).

FIG. 23 (i.e., Table 15) illustrates a transmission of HARQ-ACK multiplexing for M=4. FIG. 24 (i.e., Table 16) illustrates a transmission of HARQ-ACK multiplexing for M=3. FIG. 25 (i.e., Table 17) illustrates a HARQ-ACK mapping table for PUCCH format 1b with channel selection (CS) for primary component carrier (PCC) and secondary component carrier (SCC) including constellation bits (e.g., b0, b1, b2, and b3) values (e.g., A for ACK, N for NACK, D for discontinuous transmission (DTX), and D/N for DTX/NACK) and PUCCH ACK/NACK (A/N) resources (e.g., h #) for reference signals (RS) and data with data constants (const.) using 1-4 bits (e.g., M=1, M=2, M=3, or M=4) representing a HARQ-ACK bundling window.

Table 15 (i.e., FIG. 23) can summarize a legacy HARQ-ACK mapping table for more than one configured serving cell case. As shown in Table 15, an overlapped state can occur for both of 'N, any, any, any" and "A, D/N, any, any except for A, D, D, D" (last row of Table 15). An overlap state can occur when a state represents more than one state. Taking into account the overlap mapped state in Table 15, some performance degradations on the serving cell characteristic of the smaller bundling window size can occur due to 'DTX' state padding in the first solution above.

For instance, padding additional HARQ-ACK states with 'DTX' can result in the HARQ-ACK state being unknown at a node (e.g., eNB) side and therefore the scheduling of PDSCHs on PCell can be potentially restricted at the eNB resulting in substantial DL throughput loss as the PCell may not be practically usable. In another example, carrier aggregation functionality can be severely impacted or almost disabled implicitly when "DTX" padding method (e.g., first solution) is used for PUCCH format 1b with channel selection.

Based on the issue with the described "DTX" padding method, some mechanisms and solutions described can be used to alleviate the issue to enable CA functionality when PUCCH format 1b with channel selection and more than one CC with different UL-DL configurations are configured for the UE, including with SPS and SPS overriding is used.

Figure 11:
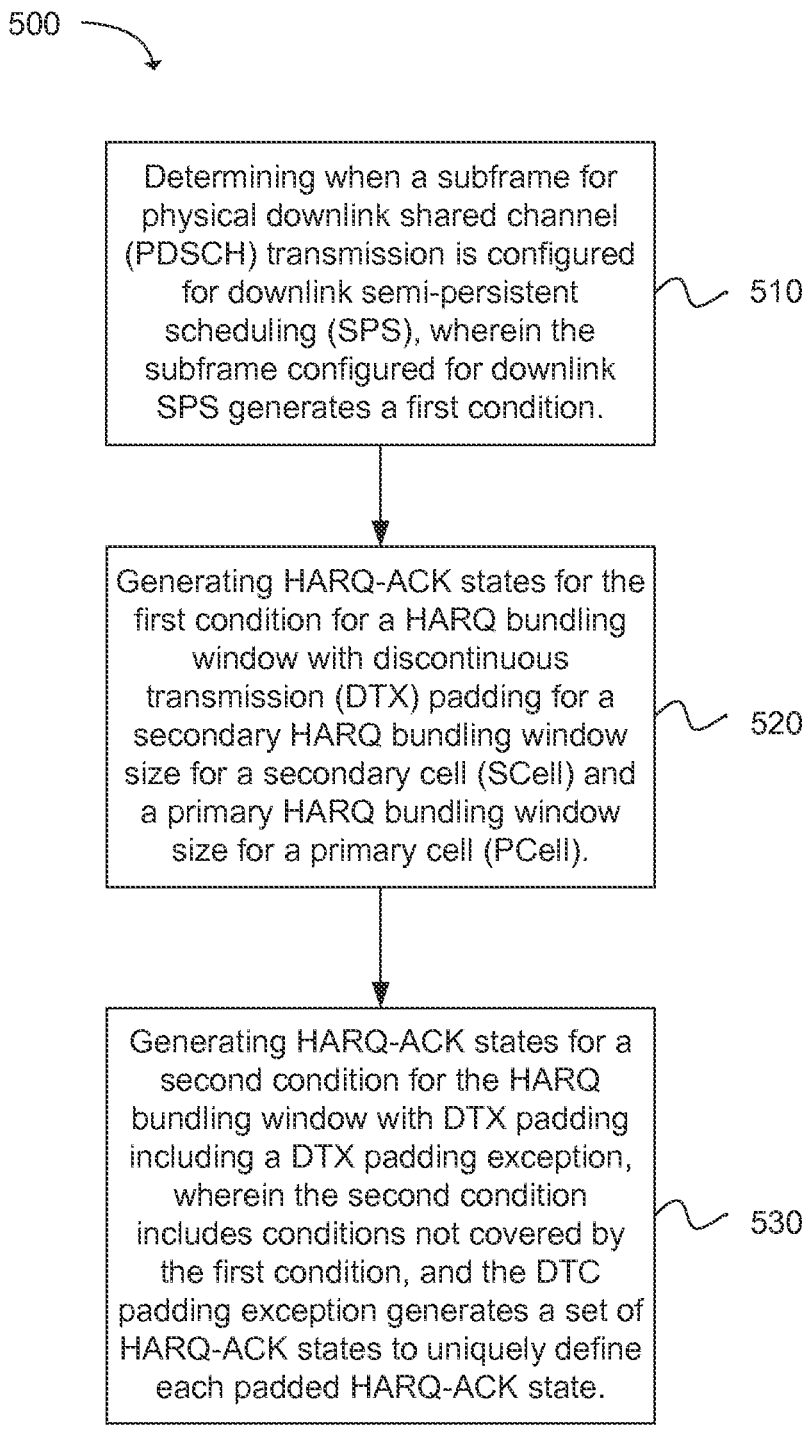
FIG. 11 depicts a flow chart of a method for conditional hybrid automatic retransmission re-quest (HARQ) mapping for carrier aggregation (CA) at a user equipment (UE) in accordance with an example.

Another example provides a method 500 for conditional hybrid automatic retransmission re-quest (HARQ) mapping for carrier aggregation (CA) at a user equipment (UE), as shown in the flow chart in FIG. 11. The method may be executed as instructions on a machine, computer circuitry, or a processor for the UE, where the instructions are included on at least one computer readable medium or one non-transitory machine readable storage medium. The method includes the operation of determining when a subframe for physical downlink shared channel (PDSCH) transmission is configured for downlink semi-persistent scheduling (SPS), wherein the subframe configured for downlink SPS generates a first condition, as in block 510. The operation of generating HARQ-ACK states for the first condition for a HARQ bundling window with discontinuous transmission (DTX) padding for a secondary HARQ bundling window size for a secondary cell (SCell) and a primary HARQ bundling window size for a primary cell (PCell) follows, as in block 520. The next operation of the method can be generating HARQ-ACK states for a second condition for the HARQ bundling window with DTX padding including a DTX padding exception, wherein the second condition includes conditions not covered by the first condition, and the DTC padding exception generates a set of HARQ-ACK states to uniquely define each padded HARQ-ACK state, as in block 530.

In an example, the method can further include: Channel selecting based on a HARQ bundling window size M=max (Mp,Ms) using a HARQ-ACK multiplexing look-up table, where Mp is the primary HARQ bundling window size and Ms is the secondary HARQ bundling window size; and transmitting the HARQ-ACK states using the constellation bits b(0) and b(1) in the a physical uplink control channel (PUCCH) resource $n_{PUCCH}^{(1)}$. The constellation bits b(0) and b(1) and the PUCCH resource $n_{PUCCH}^{(1)}$ can be based on the HARQ-ACK multiplexing look-up table. The HARQ-ACK multiplexing look-up table can include: A Third Generation Partnership Project (3GPP) Long Term Evolution (LTE) standard Release 11 Technical Specification (TS) 36.213 Table 10.1.3.2-5 (e.g., Table 13 illustrated in FIG. 21) when M=3, or an LTE TS 36.213 Rel. 11 Table 10.1.3.2-6 (e.g., Table 14 illustrated in FIG. 22) when M=4.

In another example, the operation of generating the HARQ-ACK states for the second condition can further include: Generating a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink SPS release and with a DAI value in the PDCCH equal to 'j+1' is received; otherwise generating a HARQ-ACK(j) with a DTX value except for a special case representing the DTX padding exception when the secondary HARQ bundling window size differs from the primary HARQ bundling window size. For the special case, the operation of generating the HARQ-ACK states for the second condition can further include: Remapping a state of "ACK,NACK" for a serving cell with min(Mp,Ms)=2 to "ACK,DTX,DTX,DTX" for an ordered series {HARQ-ACK(0),HARQ-ACK(1),HARQ-ACK(2), HARQ-ACK (3)} when min(Mp,Ms)=2 and max(Mp,Ms)=4; remapping a state of "NACK,ACK" for a serving cell with min(Mp,Ms)=2 to "ACK,ACK,ACK,NACK/DTX" for an ordered series {HARQ-ACK(0),HARQ-ACK (1),HARQ-ACK(2), HARQ-ACK (3)} when min(Mp,Ms)=2 and max(Mp,Ms)=4; remapping a state of "NACK, ACK" for a serving cell with min(Mp,Ms)=2 to "ACK, ACK,ACK" for an ordered series {HARQ-ACK(0),HARQ-ACK(1),HARQ-ACK(2)} when min(Mp,Ms)=2 and max (Mp,Ms)=3; or remapping a state of "ACK,NACK, any" for a serving cell with min(Mp,Ms)=3 to "ACK,DTX,DTX, DTX" for an ordered series {HARQ-ACK(0),HARQ-ACK (1),HARQ-ACK(2), HARQ-ACK (3)} when min(Mp, Ms)=3 and max(Mp,Ms)=4.

In another configuration, the operation of generating the HARQ-ACK states for the second condition can further include: Generating a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink SPS release and with a DAI value in the PDCCH equal to 'j+1' is received; otherwise generating a HARQ-ACK(j) with a DTX value except for a special case representing the DTX padding exception when the secondary HARQ bundling window size differs from the primary HARQ bundling window size. For the special case, the operation of generating the HARQ-ACK states for the second condition can further include: Remapping a state of "ACK,NACK" for a serving cell with min(Mp,Ms)=2 to "ACK,ACK,ACK,NACK/DTX" for an ordered series {HARQ-ACK(0),HARQ-ACK(1),HARQ-ACK(2), HARQ-ACK (3)} when min(Mp,Ms)=2 and max (Mp,Ms)=4; remapping a state of "NACK,ACK" for a serving cell with min(Mp,Ms)=2 to "ACK,DTX,DTX, DTX" for an ordered series {HARQ-ACK(0),HARQ-ACK (1),HARQ-ACK(2), HARQ-ACK (3)} when min(Mp,Ms) =2 and max(Mp,Ms)=4; remapping a state of "NACK, ACK" for a serving cell with min(Mp,Ms)=2 to "ACK, ACK,ACK" for an ordered series {HARQ-ACK(0),HARQ-ACK(1),HARQ-ACK(2)} when min(Mp,Ms)=2 and max (Mp,Ms)=3; or remapping a state of "ACK,NACK, any" for a serving cell with min(Mp,Ms)=3 to "ACK,DTX,DTX, DTX" for an ordered series {HARQ-ACK(0),HARQ-ACK (1),HARQ-ACK(2), HARQ-ACK (3)} when min(Mp, Ms)=3 and max(Mp,Ms)=4.

In another example, the operation of generating the HARQ-ACK states for the first condition for the PCell can further include: Generating a HARQ-ACK( 0) corresponding to an ACK, a negative ACK (NACK), or a discontinuous transmission (DTX) response for the PDSCH transmission without the corresponding PDCCH for a Third Generation Partnership Project (3GPP) Long Term Evolution (LTE) standard Release 11 physical uplink control channel (PUCCH) format 1b; or generating a HARQ-ACK(j) corresponding to the ACK, the NACK, or the DTX response for LTE standard Release 11 PUCCH format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j' or a PDCCH indicating a downlink SPS release and with a DAI value in the PDCCH equal to 'j' is received; otherwise generating a HARQ-ACK(j) set to a DTX; and In another example, the operation of generating the HARQ-ACK states for the first condition for the SCell can further include: Generating a HARQ-ACK(j) corresponding to the ACK, the NACK, or the DTX response for LTE standard Release 11 PUCCH format 1b, for 0≤j≤M−1, where M=max (Mp,Ms), when the PDSCH transmission with the corresponding PDCCH and a downlink assignment index (DAI) value in the PDCCH equal to 'j+1' is received; otherwise generating a HARQ-ACK(j) set to a DTX.

In another configuration, the method can further include: Receiving an uplink-downlink (UL-DL) configuration for the primary cell and an UL-DL configuration for the secondary cell (SCell); and determining the secondary HARQ bundling window size for a subframe based on the UL-DL configuration for the SCell and the primary HARQ bundling window size for the subframe based on the UL-DL configuration for the PCell. The UL-DL configuration for the PCell can be included a system information block 1 (SIB1) transmitted on the PCell and the UL-DL configuration for the SCell can be included a SIB1 transmitted on the SCell.

Figure 12:
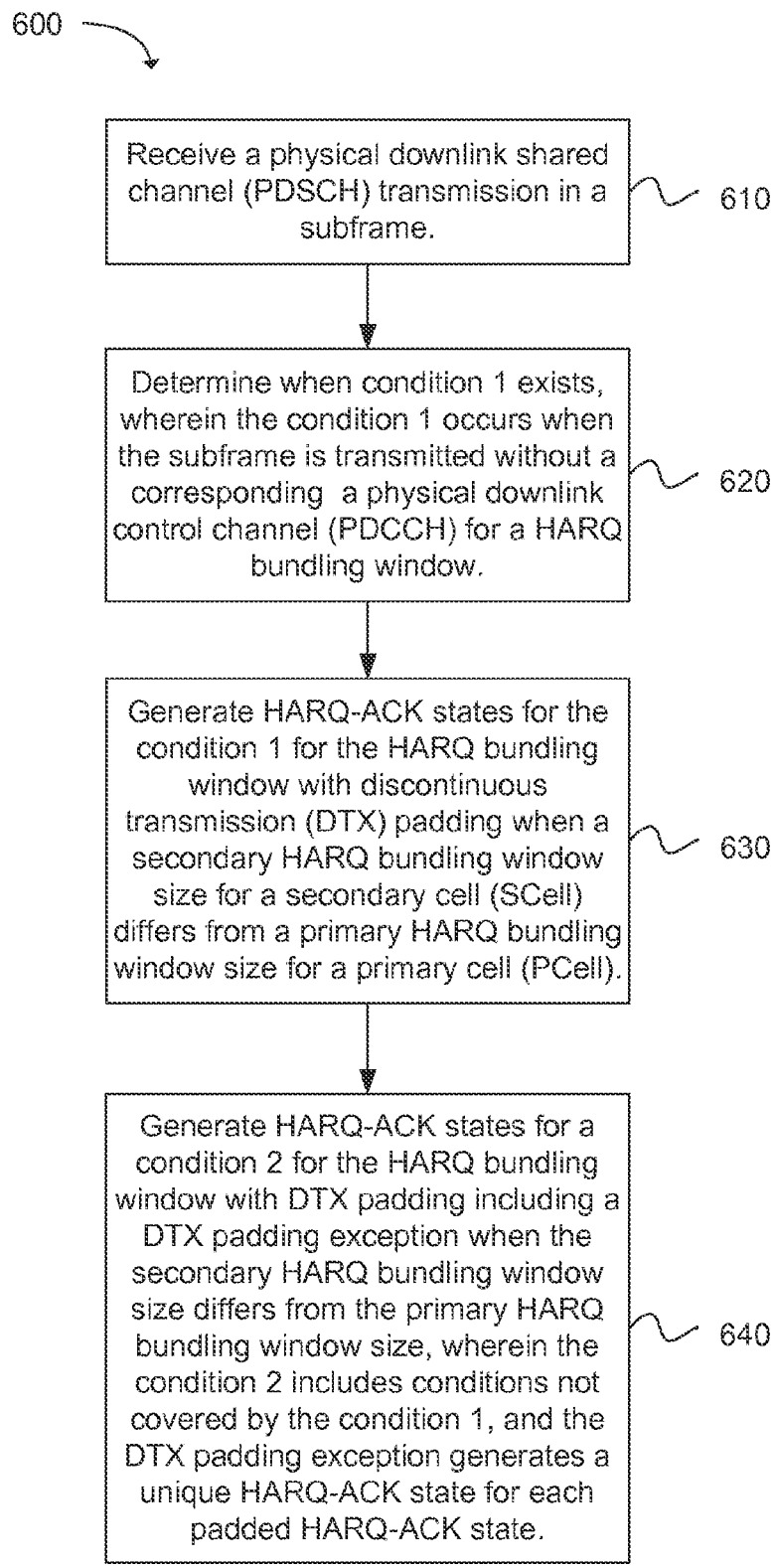
FIG. 12 depicts functionality of computer circuitry of a user equipment (UE) operable to provide conditional hybrid automatic retransmission re-quest-acknowledge (HARQ-ACK) states mapping for carrier aggregation (CA) in accordance with an example.

Another example provides functionality 600 of computer circuitry of a processor on a user equipment (UE) operable to provide conditional hybrid automatic retransmission request-acknowledge (HARQ-ACK) states mapping for carrier aggregation (CA), as shown in the flow chart in FIG. 12. The functionality may be implemented as a method or the functionality may be executed as instructions on a machine, where the instructions are included on at least one computer readable medium or one non-transitory machine readable storage medium. The computer circuitry can be configured to receive a physical downlink shared channel (PDSCH) transmission in a subframe, as in block 610. The computer circuitry can be further configured to determine when condition 1 exists, wherein the condition 1 occurs when the subframe is transmitted without a corresponding a physical downlink control channel (PDCCH) for a HARQ bundling window, as in block 620. The computer circuitry can also be configured to generate HARQ-ACK states for the condition 1 for the HARQ bundling window with discontinuous transmission (DTX) padding when a secondary HARQ bundling window size for a secondary cell (SCell) differs from a primary HARQ bundling window size for a primary cell (PCell), as in block 630. The computer circuitry can be further configured to generate HARQ-ACK states for a condition 2 for the HARQ bundling window with DTX padding including a DTX padding exception when the secondary HARQ bundling window size differs from the primary HARQ bundling window size, wherein the condition 2 includes conditions not covered by the condition 1, and the DTX padding exception generates a unique HARQ-ACK state for each padded HARQ-ACK state, as in block 640.

In an example, the computer circuitry can be further configured to: Perform channel selection based on a HARQ bundling window size M=max (Mp,Ms) using a HARQ-ACK multiplexing look-up table, where Mp is the primary HARQ bundling window size and Ms is the secondary HARQ bundling window size; generate constellation bits b(0) and b(1) and a physical uplink control channel (PUCCH) resource $n_{PUCCH}^{(1)}$ based on the HARQ-ACK multiplexing look-up table; and transmit the HARQ-ACK states using the constellation bits b(0) and b(1) in the PUCCH resource $n_{PUCCH}^{(1)}$. The HARQ-ACK multiplexing look-up table can include: A Third Generation Partnership Project (3GPP) Long Term Evolution (LTE) standard Release 11 Technical Specification (TS) 36.213 which includes Table 10.1.3.2-5 (e.g., Table 13 illustrated in FIG. 21) when M=3, or a Table 10.1.3.2-6 (e.g., Table 14 illustrated in FIG. 22) when M=4.

In another example, the computer circuitry configured to generate the HARQ-ACK states for the condition 2 can be further configured to: Generate a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink semi-persistent scheduling (SPS) release and with a DAI value in the PDCCH equal to 'j+1' is received; otherwise generate a HARQ-ACK(j) set to a DTX with an exception for a special case. The computer circuitry can be further configured for the special case to: Remap a state of "ACK,NACK" for a serving cell with min(Mp,Ms)=2 to "ACK,DTX,DTX,DTX" for an ordered series {HARQ-ACK(0),HARQ-ACK(1),HARQ-ACK(2), HARQ-ACK (3)} when min(Mp,Ms)=2 and max(Mp,Ms)=4; remap a state of "NACK,ACK" for a serving cell with min(Mp,Ms)=2 to "ACK,ACK,ACK, NACK/DTX" for an ordered series {HARQ-ACK(0), HARQ-ACK(1),HARQ-ACK(2), HARQ-ACK (3)} when min(Mp,Ms)=2 and max(Mp,Ms)=4; remap a state of "NACK,ACK" for a serving cell with min(Mp,Ms)=2 to "ACK,ACK,ACK" for an ordered series {HARQ-ACK(0), HARQ-ACK(1),HARQ-ACK(2)} when min(Mp,Ms)=2 and max(Mp,Ms)=3; or remap a state of "ACK,NACK, any" for a serving cell with min(Mp,Ms)=3 to "ACK,DTX,DTX, DTX" for an ordered series {HARQ-ACK(0),HARQ-ACK (1),HARQ-ACK(2), HARQ-ACK (3)} when min(Mp, Ms)=3 and max(Mp,Ms)=4.

In another configuration, the computer circuitry configured to generate the HARQ-ACK states for the condition 2 can be further configured to: Generate a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink semi-persistent scheduling (SPS) release and with a DAI value in the PDCCH equal to 'j+1' is received; otherwise generate a HARQ-ACK(j) set to a DTX with an exception for a special case. The computer circuitry can be further configured for the special case to: Remap a state of "ACK,NACK" for a serving cell with min(Mp,Ms)=2 to "ACK,ACK,ACK,NACK/DTX" for an ordered series {HARQ-ACK(0),HARQ-ACK(1),HARQ-ACK(2), HARQ-ACK (3)} when min(Mp,Ms)=2 and max(Mp,Ms)=4; remap a state of "NACK,ACK" for a serving cell with min(Mp, Ms)=2 to "ACK,DTX,DTX,DTX" for an ordered series {HARQ-ACK(0),HARQ-ACK(1),HARQ-ACK(2), HARQ-ACK (3)} when min(Mp,Ms)=2 and max(Mp,Ms)=4; remap a state of "NACK,ACK" for a serving cell with min(Mp, Ms)=2 to "ACK,ACK,ACK" for an ordered series {HARQ-ACK(0),HARQ-ACK(1),HARQ-ACK(2)} when min(Mp, Ms)=2 and max(Mp,Ms)=3; or remap a state of "ACK, NACK, any" for a serving cell with min(Mp,Ms)=3 to "ACK,DTX,DTX,DTX" for an ordered series {HARQ-ACK(0),HARQ-ACK(1),HARQ-ACK(2), HARQ-ACK (3)} when min(Mp,Ms)=3 and max(Mp,Ms)=4.

In another example, the computer circuitry configured to generate HARQ-ACK states for the condition 1 for the PCell can be further configured to: Generate a HARQ-ACK(0) corresponding to an ACK, a negative ACK (NACK), or a discontinuous transmission (DTX) response for the PDSCH transmission without the corresponding PDCCH for a Third Generation Partnership Project (3GPP) Long Term Evolution (LTE) standard Release 11 physical uplink control channel (PUCCH) format 1b, or generate a HARQ-ACK(j) corresponding to the ACK, the NACK, or the DTX response for LTE standard Release 11 PUCCH format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j' or a PDCCH indicating a downlink semi-persistent scheduling (SPS) release and with a DAI value in the PDCCH equal to 'j' is received; otherwise generate a HARQ-ACK(j) set to a DTX.

In another example, the computer circuitry configured to generate HARQ-ACK states for the condition 1 for the SCell can be further configured to: Generate a HARQ-ACK(j) corresponding to the ACK, the NACK, or the DTX response for LTE standard Release 11 PUCCH format 1b, for 0≤j≤M−1, where M=max (Mp,Ms), when the PDSCH transmission with the corresponding PDCCH and a downlink assignment index (DAI) value in the PDCCH equal to 'j+1' is received; otherwise generate a HARQ-ACK(j) set to a DTX.

In another configuration, the computer circuitry can be further configured to: Generate a physical uplink control channel (PUCCH) resource allocation (RA) for the condition 1 for the PCell, where: A PUCCH resource $n_{PUCCH,0}^{(1)}$ value is determined according to a higher layer configuration and a Third Generation Partnership Project (3GPP) Long Term Evolution (LTE) standard Release 11 Technical Specification (TS) 36.213 Table 9.2-2 (e.g., Table 6); or a PUCCH resource $n_{PUCCH}^{(1)}$ for transmission of the HARQ-ACK in a subframe n for a Third Generation Partnership Project (3GPP) Long Term Evolution (LTE) standard Release 11 PUCCH format 1b for the PDSCH transmission on the primary cell indicated by the detection of the corresponding PDCCH or the PDCCH indicating downlink semi-persistent scheduling (SPS) release in one subframe of bundling window with a downlink assignment index (DAI) value in the PDCCH equal to '1', where PUCCH resource $n_{PUCCH}^{(1)}$ is represented by $n_{PUCCH,i}^{(1)} = (M-m-1) \cdot N_c + m \cdot N_{c+1} + n_{CCE,m} + N_{PUCCH}$ for time division duplex (TDD) where the HARQ bundling window size M=max (Mp,Ms), and Mp is the primary HARQ bundling window size and Ms is the secondary HARQ bundling window size, $n_{CCE,m}$ is a first CCE index number used for transmission of the corresponding PDCCH in subframe $n-k_m$ of the bundling window and the corresponding m, where $k_m$ is the smallest value in set K such that UE detects a PDCCH in subframe $n-k_m$, $N_c$=max $\{0, \lfloor [N_{RB}^{DL} \cdot (N_{sc}^{RB} \cdot c-4)]/36 \rfloor\}$ where c is a value out of $\{0, 1, 2, 3\}$ such that $N_c \leq n_{CCE,m} < N_{c+1}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $N_{PUCCH}^{(1)}$ is a starting PUCCH channel index for a PUCCH region in an uplink subframe and is configured by high layers for each UE.

In another configuration, the computer circuitry can be further configured to: Generate a physical uplink control channel (PUCCH) resource allocation (RA) for the condition 1 for the SCell, where: A PUCCH resource $n_{PUCCH}^{(1)}$ for transmission of the HARQ-ACK in a subframe n for the LTE PUCCH format 1b for the PDSCH transmission on the secondary cell indicated by the detection of the corresponding PDCCH on the primary cell in one subframe of bundling window with a downlink assignment index (DAI) value in the PDCCH equal to '1' or '2', where PUCCH resource $n_{PUCCH}^{(1)}$ is represented $n_{PUCCH,i}^{(1)}=(M-m-1) \cdot N_c + m \cdot N_{c+1} + n_{CCE,m} + N_{PUCCH}^{(1)}$ for time division duplex (TDD), where i=2 for the corresponding PDCCH with the DAI value equal to '1' and i=3 for the corresponding PDCCH with the DAI value equal to '2'; or a PUCCH resource $n_{PUCCH,2}^{(1)}$ and $n_{PUCCH,3}^{(1)}$ for transmission of the HARQ-ACK in a subframe n for the LTE PUCCH format 1b are indicated a ACK/negative ACK (NACK) resource indicator (ARI) for the PDSCH transmission indicated by the detection of the corresponding PDCCH within a subframe n–k is determined according to a higher layer configuration and the LTE TS 36.213 Table 9.2-2 (e.g., Table 6), where the ARI reinterprets a transmit power control (TPC) filed in a downlink control information (DCI) format of the corresponding PDCCH.

In another example, the computer circuitry can be further configured to: Generate a physical uplink control channel (PUCCH) resource allocation (RA) for the condition 2 for the PCell, where: A PUCCH resource $n_{PUCCH}^{(1)}$ for transmission of the HARQ-ACK in a subframe n for a Third Generation Partnership Project (3GPP) Long Term Evolution (LTE) standard Release 11 PUCCH format 1b for the PDSCH transmission on the primary cell indicated by the detection of the corresponding PDCCH or the PDCCH indicating downlink semi-persistent scheduling (SPS) release in one subframe of bundling window with a downlink assignment index (DAI) value in the PDCCH equal to '1', where PUCCH resource $n_{PUCCH}^{(1)}$ is represented by:

$$n_{PUCCH}^{(1)}=(M-m-1) \cdot N_c + m \cdot N_{c+1} + n_{CCE,m} + N_{PUCCH}^{(1)}$$

for time division duplex (TDD) where the HARQ bundling window size M=max (Mp,Ms), and Mp is the primary HARQ bundling window size and Ms is the secondary HARQ bundling window size, $n_{CCE,m}$ is a first CCE index number used for transmission of the corresponding PDCCH in subframe $n-k_m$ of the bundling window and the corresponding m, where $k_m$ is the smallest value in set K such that UE detects a PDCCH in subframe $n-k_m$, $N_c$=max $\{0, \lfloor [N_{RB}^{DL} \cdot (N_{sc}^{RB} \cdot c-4)]/36 \rfloor\}$ where c is a value out of $\{0, 1, 2, 3\}$ such that $N_c \leq n_{CCE,m} < N_{c+1}$, $N_{RB}^{DL}$ is a downlink bandwidth configuration, expressed in units of $N_{sc}^{RB}$, $N_{sc}^{RB}$ is a resource block size in the frequency domain, expressed as a number of subcarriers, and $n_{PUCCH}^{(1)}$ is a starting PUCCH channel index for a PUCCH region in an uplink subframe and is configured by high layers for each UE.

In another example, the computer circuitry can be further configured to: Generate a physical uplink control channel (PUCCH) resource allocation (RA) for the condition 2 for the SCell, where: A PUCCH resource $n_{PUCCH}^{(1)}$ for transmission of the HARQ-ACK in a subframe n for the LTE PUCCH format 1b for the PDSCH transmission on the secondary cell indicated by the detection of the corresponding PDCCH on the primary cell in one subframe of bundling window with a downlink assignment index (DAI) value in the PDCCH equal to '1' or '2', wherein PUCCH resource $n_{PUCCH}^{(1)}$ is represented by $n_{PUCCH,i}^{(1)}=(M-m-1) \cdot N_c + m \cdot N_{c+1} + n_{CCE} + N_{PUCCH}^{(1)}$ for time division duplex (TDD), where i=2 for the corresponding PDCCH with the DAI value equal to '1' and i=3 for the corresponding PDCCH with the DAI value equal to '2'; or a PUCCH resource $n_{PUCCH,2}^{(1)}$ and $n_{PUCCH,3}^{(1)}$ for transmission of the HARQ-ACK in a subframe n for the LTE PUCCH format 1b are indicated a ACK/negative ACK (NACK) resource indicator (ARI) for the PDSCH transmission indicated by the detection of the corresponding PDCCH within a subframe n–k is determined according to a higher layer configuration and the LTE TS 36.213 Table 9.2-2 (e.g., Table 6), where the ARI reinterprets a transmit power control (TPC) filed in a downlink control information (DCI) format of the corresponding PDCCH.

Figure 13:
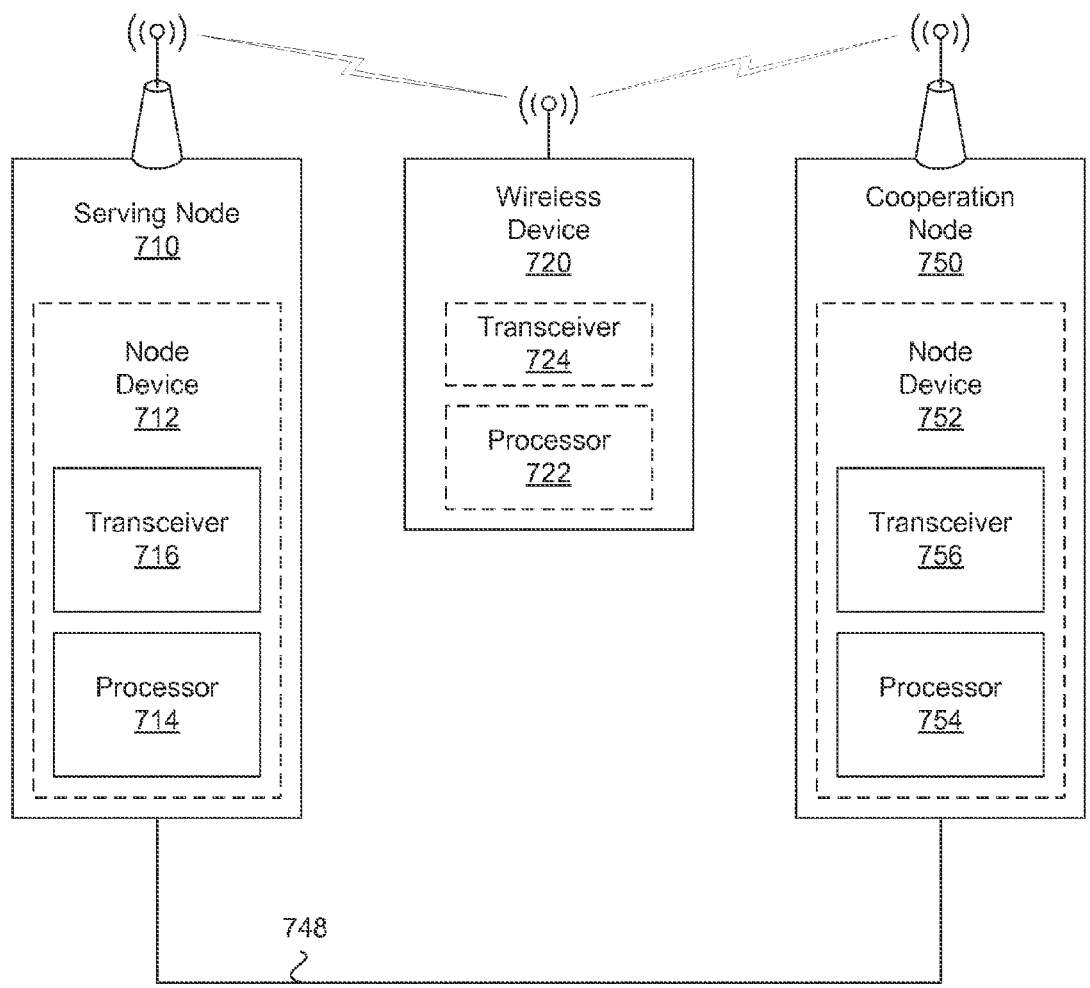
FIG. 13 illustrates a block diagram of a serving node, a coordination node, and wireless device (e.g., UE) in accordance with an example.

FIG. 13 illustrates an example node (e.g., serving node 710 and cooperation node 750) and an example wireless device 720. The node can include a node device 712 and 752. The node device or the node can be configured to communicate with the wireless device. The node device, device at the node, or the node can be configured to communicate with other nodes via a backhaul link 748 (optical or wired link), such as an X2 application protocol (X2AP). The node device can include a processor 714 and 754 and a transceiver 716 and 756. The transceiver can be configured to receive a HARQ-ACK feedback in a PUCCH resource. The transceiver 716 and 756 can be further configured to communicate with the coordination node via an X2 application protocol (X2AP). The processor can be further configured to a reverse procedure can be implemented for PUCCH detection and PDSCH retransmission as disclosed herein. The serving node can generate both the PCell and the SCell. The node (e.g., serving node 710 and cooperation node 750) can include a base station (BS), a Node B (NB), an evolved Node B (eNB), a baseband unit (BBU), a remote radio head (RRH), a remote radio equipment (RRE), a remote radio unit (RRU), or a central processing module (CPM).

The device (used by a node) can be configured to detect a hybrid automatic retransmission re-quest (HARQ) bundle used in carrier aggregation (CA). The transceiver 716 and 756 can be configured to receive constellation bits in a physical uplink control channel (PUCCH) resource in a subframe transmitted in a primary cell (PCell) for a physical downlink shared channel (PDSCH) of the PCell and a PDSCH for a secondary cell (SCell). The processor 714 and 754 can be configured to: Determine a HARQ bundling window size based on a primary HARQ bundling window size for the subframe based on an UL-DL configuration for a primary cell (PCell) and a secondary HARQ bundling window size for a subframe based on an uplink-downlink (UL-DL) configuration for a secondary cell (SCell); determine a HARQ-ACKnowledge (ACK) response for the subframe using the HARQ bundling window size, constellation bits, and the PUCCH resource; determine when condition 1 exists, where the condition 1 occurs when the subframe is transmitted without a corresponding a physical downlink control channel (PDCCH) within a HARQ bundling window; decode HARQ-ACK states for the condition 1 for the HARQ bundling window with discontinuous transmission (DTX) padding when a secondary HARQ bundling window size for a secondary cell (SCell) differs from a primary HARQ bundling window size for a primary cell (PCell); and decode HARQ-ACK states for a condition 2 for the HARQ bundling window with DTX padding including a DTX padding exception when the secondary HARQ bundling window size differs from the primary HARQ bundling window size. The condition 2 can include conditions not covered by the condition 1, and the DTC padding exception can decode a unique HARQ-ACK state for each padded HARQ-ACK state.

In another example, the processor configured to decode HARQ-ACK states can be further configured to decode a channel based on constellation bits b(0) and b(1), a physical uplink control channel (PUCCH) resource $n_{PUCCH}^{(1)}$, and a HARQ bundling window size M=max (Mp,Ms) using a HARQ-ACK multiplexing look-up table, where Mp is the primary HARQ bundling window size and Ms is the secondary HARQ bundling window size. The HARQ-ACK multiplexing look-up table can include a Third Generation Partnership Project (3GPP) Long Term Evolution (LTE) standard Release 11 Technical Specification (TS) 36.213 Table 10.1.3.2-5 when M=3 (e.g., Table 13 illustrated in FIG. 21), or a Table 10.1.3.2-6 when M=4 (e.g., Table 14 illustrated in FIG. 22).

In another configuration, the processor configured to decode HARQ-ACK states for the condition 1 can be further configured to: Decode a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink semi-persistent scheduling (SPS) release and with a DAI value in the PDCCH equal to 'j+1' is received; otherwise decode a HARQ-ACK(j) set to a DTX with an exception for a special case representing the DTX padding exception. The processor can be further configured for the special case to: Remap a state of "ACK,DTX,DTX,DTX" for an ordered series {HARQ-ACK(0),HARQ-ACK(1),HARQ-ACK(2), HARQ-ACK (3)} for a serving cell with min(Mp,Ms)=2 to "ACK, NACK" when min(Mp,Ms)=2 and max(Mp,Ms)=4; remap a state of "ACK,ACK,ACK,NACK/DTX" for an ordered series {HARQ-ACK(0),HARQ-ACK(1),HARQ-ACK(2), HARQ-ACK (3)} for a serving cell with min(Mp,Ms)=2 to "NACK,ACK" when min(Mp,Ms)=2 and max(Mp,Ms)=4; remap a state of "ACK,ACK,ACK" for an ordered series {HARQ-ACK(0),HARQ-ACK(1),HARQ-ACK(2)} for a serving cell with min(Mp,Ms)=2 to "NACK,ACK" when min(Mp,Ms)=2 and max(Mp,Ms)=3; or remap a state of "ACK,DTX,DTX,DTX" for an ordered series {HARQ-ACK(0),HARQ-ACK(1),HARQ-ACK(2), HARQ-ACK (3)} for a serving cell with min(Mp,Ms)=3 to "ACK,NACK, any" when min(Mp,Ms)=3 and max(Mp,Ms)=4.

In another configuration, the processor configured to decode HARQ-ACK states for the condition 1 can be further configured to: Decode a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink semi-persistent scheduling (SPS) release and with a DAI value in the PDCCH equal to 'j+1' is received; otherwise decode a HARQ-ACK(j) set to a DTX with an exception for a special case representing the DTX padding exception. The processor can be further configured for the special case to: Remap a state of "ACK,ACK,ACK,NACK/DTX" for an ordered series {HARQ-ACK(0),HARQ-ACK(1),HARQ-ACK(2), HARQ-ACK (3)} for a serving cell with min(Mp,Ms)=2 to "ACK,NACK" when min(Mp,Ms)=2 and max(Mp,Ms)=4; remap a state of "ACK,DTX,DTX,DTX" for an ordered series {HARQ-ACK(0),HARQ-ACK(1),HARQ-ACK(2), HARQ-ACK (3)} for a serving cell with min(Mp,Ms)=2 to "NACK,ACK" when min(Mp,Ms)=2 and max(Mp,Ms)=4; remap a state of "ACK,ACK,ACK" for an ordered series {HARQ-ACK(0),HARQ-ACK(1),HARQ-ACK(2)} for a serving cell with min(Mp,Ms)=2 to "NACK,ACK" when min(Mp,Ms)=2 and max(Mp,Ms)=3; or remap a state of "ACK,DTX,DTX,DTX" for an ordered series {HARQ-ACK(0),HARQ-ACK(1),HARQ-ACK(2), HARQ-ACK (3)} for a serving cell with min(Mp,Ms)=3 to "ACK,NACK, any" when min(Mp,Ms)=3 and max(Mp,Ms)=4.

In another example, the processor configured to decode HARQ-ACK states for the condition 2 for the PCell can be further configured to: Decode a HARQ-ACK(0) corresponding to an ACK, a negative ACK (NACK), or a discontinuous transmission (DTX) response for the PDSCH transmission without the corresponding PDCCH for a Third Generation Partnership Project (3GPP) Long Term Evolution (LTE) standard Release 11 physical uplink control channel (PUCCH) format 1b; or decode a HARQ-ACK(j) corresponding to the ACK, the NACK, or the DTX response for LTE standard Release 11 PUCCH format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j' or a PDCCH indicating a downlink semi-persistent scheduling (SPS) release and with a DAI value in the PDCCH equal to 'j' is received; otherwise decode a HARQ-ACK(j) set to a DTX.

In another example, the processor configured to decode HARQ-ACK states for the condition 2 for the SCell can be further configured to: Decode a HARQ-ACK(j) corresponding to the ACK, the NACK, or the DTX response for LTE standard Release 11 PUCCH format 1b, for 0≤j≤M−1, where M=max (Mp,Ms), when the PDSCH transmission with the corresponding PDCCH and a downlink assignment index (DAI) value in the PDCCH equal to 'j+1' is received; otherwise decode a HARQ-ACK(j) set to a DTX.

The wireless device 720 (e.g., UE) can include a transceiver 724 and a processor 722. The wireless device (i.e., device) can be configured for conditional hybrid automatic retransmission re-quest (HARQ) mapping for carrier aggregation (CA), as described in 500 of FIG. 11 or 600 of FIG. 12.

Figure 14:
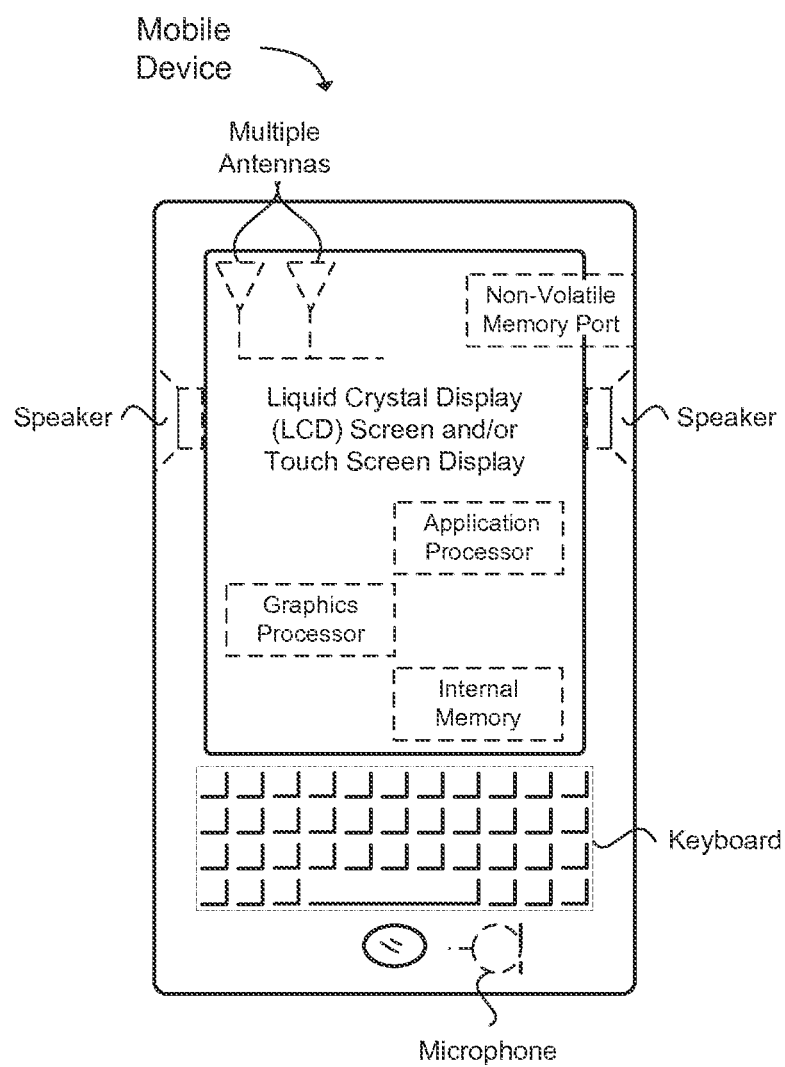
FIG. 14 illustrates a diagram of a wireless device (e.g., UE) in accordance with an example.

FIG. 14 provides an example illustration of the wireless device, such as an user equipment (UE), a mobile station (MS), a mobile wireless device, a mobile communication device, a tablet, a handset, or other type of wireless device.

The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 14 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to provide conditional hybrid automatic retransmission re-quest-acknowledge (HARQ-ACK) states mapping for carrier aggregation (CA), the UE comprising one or more processors and memory configured to:

receive a physical downlink shared channel (PDSCH) transmission in a subframe;

determine when condition 1 exists, wherein the condition 1 occurs when the subframe is transmitted without a corresponding physical downlink control channel (PDCCH) for a HARQ bundling window;

generate HARQ-ACK states for the condition 1 for the HARQ bundling window with discontinuous transmission (DTX) padding when a secondary HARQ bundling window size for a secondary cell (SCell) differs from a primary HARQ bundling window size for a primary cell (PCell), wherein the computer circuitry configured to generate the HARQ-ACK states for the condition 1 is further configured to:

for the PCell:
  generate a HARQ-ACK(0) corresponding to an ACK, a negative ACK (NACK), or a discontinuous transmission (DTX) response for the PDSCH transmission without the corresponding PDCCH for a Third Generation Partnership Project (3GPP) Long Term Evolution (LTE) standard Release 11 physical uplink control channel (PUCCH) format 1b, or
  generate a HARQ-ACK(j) corresponding to the ACK, the NACK, or the DTX response for LTE standard Release 11 PUCCH format 1b, for $0 \leq j \leq M-1$, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j' or a PDCCH indicating a downlink semi-persistent scheduling (SPS) release and with a DAI value in the PDCCH equal to 'j' is received; otherwise
  generate a HARQ-ACK(j) set to a DTX; and for the SCell:
  generate a HARQ-ACK(j) corresponding to the ACK, the NACK, or the DTX response for LTE standard Release 11 PUCCH format 1b, for $0 \leq j \leq M-1$, where M=max (Mp,Ms), when the PDSCH transmission with the corresponding PDCCH and a downlink assignment index (DAI) value in the PDCCH equal to 'j+1' is received; otherwise
  generate a HARQ-ACK(j) set to a DTX; and
  generate HARQ-ACK states for a condition 2 for the HARQ bundling window with DTX padding including a DTX padding exception when the secondary HARQ bundling window size differs from the primary HARQ bundling window size, wherein the condition 2 includes conditions not covered by the condition 1, and the DTX padding exception generates a unique HARQ-ACK state for each padded HARQ-ACK state, wherein the one or more processors and memory configured to generate the HARQ-ACK states for the condition 2 is further configured to generate a HARQ-ACK (j) set to a DTX with an exception for a special case, wherein the computer circuitry is further configured for the special case to:

remap a state of "ACK,NACK" for a serving cell with min(Mp,Ms)=2 to "ACK,DTX,DTX,DTX" for an ordered series {HARQ-ACK(0),HARQ-ACK(1), HARQ-ACK(2), HARQ-ACK (3)} when min(Mp, Ms)=2 and max(Mp,Ms)=4;

remap a state of "NACK,ACK" for a serving cell with min(Mp,Ms)=2 to "ACK,ACK,ACK,NACK/DTX" for an ordered series {HARQ-ACK(0),HARQ-ACK (1),HARQ-ACK(2), HARQ-ACK (3)} when min (Mp,Ms)=2 and max(Mp,Ms)=4;

remap a state of "NACK,ACK" for a serving cell with min(Mp,Ms)=2 to "ACK,ACK,ACK" for an ordered series {HARQ-ACK(0),HARQ-ACK(1),HARQ-ACK(2)} when min(Mp,Ms)=2 and max(Mp,Ms)=3, remap a state of "ACK,NACK, any" for a serving cell with min(Mp,Ms)=3 to "ACK,DTX,DTX,DTX" for an ordered series {HARQ-ACK(0),HARQ-ACK(1), HARQ-ACK(2), HARQ-ACK (3)} when min(Mp, Ms)=3 and max(Mp,Ms)=4;

remap a state of "ACK,NACK" for a serving cell with min(Mp,Ms)=2 to "ACK,ACK,ACK,NACK/DTX" for an ordered series {HARQ-ACK(0),HARQ-ACK (1),HARQ-ACK(2), HARQ-ACK (3)} when min (Mp,Ms)=2 and max(Mp,Ms)=4;

remap a state of "NACK,ACK" for a serving cell with min(Mp,Ms)=2 to "ACK,DTX,DTX,DTX" for an ordered series {HARQ-ACK(0),HARQ-ACK(1), HARQ-ACK(2), HARQ-ACK (3)} when min(Mp, Ms)=2 and max(Mp,Ms)=4;

remap a state of "NACK,ACK" for a serving cell with min(Mp,Ms)=2 to "ACK,ACK,ACK" for an ordered series {HARQ-ACK(0),HARQ-ACK(1),HARQ-ACK(2)} when min(Mp,Ms)=2 and max(Mp, Ms)=3; or remap a state of "ACK,NACK, any" for a serving cell with min(Mp,Ms)=3 to "ACK,DTX,DTX,DTX" for an ordered series {HARQ-ACK(0),HARQ-ACK(1), HARQ-ACK(2), HARQ-ACK (3)} when min(Mp, Ms)=3 and max(Mp,Ms)=4.

2. The UE of claim 1, wherein the one or more processors and memory are further configured to:

perform channel selection based on a HARQ bundling window size M=max (Mp,Ms) using a HARQ-ACK multiplexing look-up table, where Mp is the primary HARQ bundling window size and Ms is the secondary HARQ bundling window size, wherein the HARQ-ACK multiplexing look-up table includes:

a Table 10.1.3.2-5 in a Third Generation Partnership Project (3GPP) Long Term Evolution (LTE) standard Release 11 Technical Specification (TS) 36.213 when M=3,

TABLE 10.1.3.2-5

Transmission of HARQ-ACK multiplexing for M = 3

| Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation $b(0), b(1)$ | RM Code Input Bits $o(0), o(1), o(2), o(3)$ |
|---|---|---|---|---|
| ACK, ACK, ACK | ACK, ACK, ACK | $n^{(1)}_{PUCCH,1}$ | 1, 1 | 1, 1, 1, 1 |
| ACK, ACK, NACK/DTX | ACK, ACK, ACK | $n^{(1)}_{PUCCH,1}$ | 0, 0 | 1, 0, 1, 1 |
| ACK, NACK/DTX, any | ACK, ACK, ACK | $n^{(1)}_{PUCCH,3}$ | 1, 1 | 0, 1, 1, 1 |
| NACK/DTX, any, any | ACK, ACK, ACK | $n^{(1)}_{PUCCH,3}$ | 0, 1 | 0, 0, 1, 1 |
| ACK, ACK, ACK | ACK, ACK, NACK/DTX | $n^{(1)}_{PUCCH,0}$ | 1, 0 | 1, 1, 1, 0 |
| ACK, ACK, NACK/DTX | ACK, ACK, NACK/DTX | $n^{(1)}_{PUCCH,3}$ | 1, 0 | 1, 0, 1, 0 |
| ACK, NACK/DTX, any | ACK, ACK, NACK/DTX | $n^{(1)}_{PUCCH,0}$ | 0, 1 | 0, 1, 1, 0 |
| NACK/DTX, any, any | ACK, ACK, NACK/DTX | $n^{(1)}_{PUCCH,3}$ | 0, 0 | 0, 0, 1, 0 |
| ACK, ACK, ACK | ACK, NACK/DTX, any | $n^{(1)}_{PUCCH,2}$ | 1, 1 | 1, 1, 0, 1 |
| ACK, ACK, NACK/DTX | ACK, NACK/DTX, any | $n^{(1)}_{PUCCH,2}$ | 0, 1 | 1, 0, 0, 1 |
| ACK, NACK/DTX, any | ACK, NACK/DTX, any | $n^{(1)}_{PUCCH,2}$ | 1, 0 | 0, 1, 0, 1 |
| NACK/DTX, any, any | ACK, NACK/DTX, any | $n^{(1)}_{PUCCH,2}$ | 0, 0 | 0, 0, 0, 1 |
| ACK, ACK, ACK | NACK/DTX, any, any | $n^{(1)}_{PUCCH,1}$ | 1, 0 | 1, 1, 0, 0 |
| ACK, ACK, NACK/DTX | NACK/DTX, any, any | $n^{(1)}_{PUCCH,1}$ | 0, 1 | 1, 0, 0, 0 |
| ACK, NACK/DTX, any | NACK/DTX, any, any | $n^{(1)}_{PUCCH,0}$ | 1, 1 | 0, 1, 0, 0 |
| NACK, any, any | NACK/DTX, any, any | $n^{(1)}_{PUCCH,0}$ | 0, 0 | 0, 0, 0, 0 |
| DTX, any, any | NACK/DTX, any, any | No Transmission | | 0, 0, 0, 0 | or
a Table 10.1.3.2-6 in the TS 36.213 when M=4;

TABLE 10.1.3.2-6

Transmission of HARQ-ACK multiplexing for M = 4

| Primary Cell HARQ-ACK(0), HARQ-ACK(1), HARQ-ACK(2) HARQ-ACK(3) | Secondary Cell HARQ-ACK(0), HARQ-ACK(1), HARQ-ACK(2) HARQ-ACK(3) | Resource $n^{(1)}_{PUCCH}$ | Constellation $b(0), b(1)$ | RM Code Input Bits $o(0), o(1), o(2), o(3)$ |
|---|---|---|---|---|
| ACK, ACK, ACK NACK/DTX | ACK, ACK, ACK NACK/DTX | $n^{(1)}_{PUCCH,1}$ | 1, 1 | 1, 1, 1, 1 |
| ACK, ACK, NACK/DTX, any | ACK, ACK, ACK NACK/DTX | $n^{(1)}_{PUCCH,1}$ | 0, 0 | 1, 0, 1, 1 |
| ACK, DTX, DTX, DTX | ACK, ACK, ACK NACK/DTX | $n^{(1)}_{PUCCH,3}$ | 1, 1 | 0, 1, 1, 1 |
| ACK, ACK, ACK, ACK, | ACK, ACK, ACK NACK/DTX | $n^{(1)}_{PUCCH,3}$ | 1, 1 | 0, 1, 1, 1 |
| NACK/DTX, any, any, any | ACK, ACK, ACK NACK/DTX | $n^{(1)}_{PUCCH,3}$ | 0, 1 | 0, 0, 1, 1 |
| (ACK, NACK/DTX any, any) except for (ACK, DTX, DTX, DTX) | ACK, ACK, ACK NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any), except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, ACK, ACK, ACK | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK | $n^{(1)}_{PUCCH,2}$ | 0, 0 | 0, 0, 0, 1 |
| ACK, ACK, ACK, NACK/DTX | NACK/DTX, any, any, any | $n^{(1)}_{PUCCH,1}$ | 1, 0 | 1, 1, 0, 0 |
| ACK, ACK, ACK, NACK/DTX | (ACK, NACK/DTX, any, any), except for (ACK, DTX, DTX, DTX) | $n^{(1)}_{PUCCH,1}$ | 1, 0 | 1, 1, 0, 0 |
| ACK, ACK, NACK/DTX, any | NACK/DTX, any, any, any | $n^{(1)}_{PUCCH,1}$ | 0, 1 | 1, 0, 0, 0 |
| ACK, ACK, NACK/DTX, any | (ACK, NACK/DTX, any, any), except for (ACK, DTX, DTX, DTX) | $n^{(1)}_{PUCCH,1}$ | 0, 1 | 1, 0, 0, 0 |

TABLE 10.1.3.2-6-continued

Transmission of HARQ-ACK multiplexing for M = 4

| Primary Cell HARQ-ACK(0), HARQ-ACK(1), HARQ-ACK(2) HARQ-ACK(3) | Secondary Cell HARQ-ACK(0), HARQ-ACK(1), HARQ-ACK(2) HARQ-ACK(3) | Resource $n^{(1)}_{PUCCH}$ | Constellation b(0), b(1) | RM Code Input Bits o(0),o(1),o(2),o(3) |
|---|---|---|---|---|
| ACK, DTX, DTX, DTX | NACK/DTX, any, any, any | $n^{(1)}_{PUCCH,0}$ | 1, 1 | 0, 1, 0, 0 |
| ACK, DTX, DTX, DTX | (ACK, NACK/DTX, any, any), except for (ACK, DTX, DTX, DTX) | $n^{(1)}_{PUCCH,0}$ | 1, 1 | 0, 1, 0, 0 |
| ACK, ACK, ACK, ACK, | NACK/DTX, any, any, any | $n^{(1)}_{PUCCH,0}$ | 1, 1 | 0, 1, 0, 0 |
| ACK, ACK, ACK, ACK, | (ACK, NACK/DTX, any, any), except for (ACK, DTX, DTX, DTX) | $n^{(1)}_{PUCCH,0}$ | 1, 1 | 0, 1, 0, 0 |
| NACK, any, any, any | NACK/DTX, any, any, any | $n^{(1)}_{PUCCH,0}$ | 0, 0 | 0, 0, 0, 0 |
| NACK, any, any, any | (ACK, NACK/DTX, any, any), except for (ACK, DTX, DTX, DTX) | $n^{(1)}_{PUCCH,0}$ | 0, 0 | 0, 0, 0, 0 |
| (ACK, NACK/DTX, any, any), except for (ACK, DTX, DTX, DTX) | NACK/DTX, any, any, any | $n^{(1)}_{PUCCH,0}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n^{(1)}_{PUCCH,0}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 | generate constellation bits b(0) and b(1) and a physical uplink control channel (PUCCH) resource $n_{PUCCH}^{(1)}$ based on the HARQ-ACK multiplexing look-up table; and transmit the HARQ-ACK states using the constellation bits b(0) and b(1) in the PUCCH resource $n_{PUCCH}^{(1)}$.

3. The UE of claim 1, wherein the one or more processors and memory configured to generate the HARQ-ACK states for the condition 2 is further configured to:

generate a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink semi-persistent scheduling (SPS) release and with a DAI value in the PDCCH equal to 'j+1' is received.

4. The UE of claim 1, wherein the one or more processors and memory are further configured to:

generate a physical uplink control channel (PUCCH) resource allocation (RA) for the condition 1, wherein: for the PCell:

a PUCCH resource $n_{PUCCH,0}^{(1)}$ value is determined according to a higher layer configuration and a Third Generation Partnership Project (3GPP) Long Term Evolution (LTE) standard Release 11 Technical Specification (TS) 36.213 Table 9.2-2;

TABLE 9.2-2

PUCCH Resource value for Downlink Semi-Persistent Scheduling

| Value of 'TPC command for PUCCH' | $n^{(1,p)}_{PUCCH}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers | or a PUCCH resource $n_{PUCCH}^{(1)}$ for transmission of the HARQ-ACK in a subframe n for a Third Generation Partnership Project (3GPP) Long Term Evolution (LTE) standard Release 11 PUCCH format 1b for the PDSCH transmission on the primary cell indicated by the detection of the corresponding PDCCH or the PDCCH indicating downlink semi-persistent scheduling (SPS) release in one subframe of bundling window with a downlink assignment index (DAI) value in the PDCCH equal to '1', wherein PUCCH resource $n_{PUCCH}^{(1)}$ is represented by:

$n_{PUCCH,i}^{(1)} = (M-m-1) \cdot N_c + m \cdot N_{c+1} + n_{CCE,m} + N_{PUCCH}^{(1)}$ for time division duplex (TDD) where the HARQ bundling window size M=max (Mp,Ms), and Mp is the primary HARQ bundling window size and Ms is the secondary HARQ bundling window size, $n_{CCE,m}$ is a first CCE index number used for transmission of the corresponding PDCCH in subframe $n-k_m$ of the bundling window and the corresponding m, where $k_m$ is the smallest value in set K such that UE detects a PDCCH in subframe $n-k_m$;

$N_c = \max\{0, \lfloor [N_{RB}^{DL} \cdot (N_{sc}^{RB} \cdot c - 4)]/36 \rfloor\}$ where c is a value out of $\{0, 1, 2, 3\}$ such that $N_c \leq n_{CCE,m} < N_{c+1}$, $N_{RB}^{DL}$ is a downlink bandwidth configuration, expressed in units of $N_{sc}^{RB}$, $N_{sc}^{Rb}$ is a resource block size in the frequency domain, expressed as a number of subcarriers, and $N_{PUCCH}^{(1)}$ is a starting PUCCH channel index for a PUCCH region in an uplink subframe and is configured by high layers for each UE;

for the SCell:

a PUCCH resource $n_{PUCCH}^{(1)}$ for transmission of the HARQ-ACK in a subframe n for the LTE PUCCH format 1b for the PDSCH transmission on the secondary cell indicated by the detection of the corresponding PDCCH on the primary cell in one subframe of bundling window with a downlink assignment index (DAI) value in the PDCCH equal to '1' or '2', wherein PUCCH resource $n_{PUCCH}^{(1)}$ is represented by $n_{PUCCH,i}^{(1)} = (M-m-1) \cdot N_c + m \cdot N_{c+1} + n_{CCE,m} + N_{PUCCH}^{(1)}$ for time division duplex (TDD), where i =2 for the corresponding PDCCH with the DAT value equal to '1' and i=3 for the corresponding PDCCH with the DAT value equal to '2'; or a PUCCH resource $n_{PUCCH,2}^{(1)}$ and $n_{PUCCH,3}^{(1)}$ for transmission of the HARQ-ACK in a subframe n for the LTE PUCCH format 1b are indicated a ACK/negative ACK (NACK) resource indicator (ARI) for the PDSCH transmission indicated by the detection of the corresponding PDCCH within a subframe n−k is determined according to a higher layer configuration and the LTE TS 36.213 Table 9.2-2,

TABLE 9.2-2

PUCCH Resource value for Downlink Semi-Persistent Scheduling

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers | wherein the ARI re-interprets a transmit power control (TPC) filed in a downlink control information (DCI) format of the corresponding PDCCH.

5. The UE of claim 1, wherein the one or more processors and memory are further configured to:

generate a physical uplink control channel (PUCCH) resource allocation (RA) for the condition 2, wherein:

for the PCell:

a PUCCH resource $n_{PUCCH}^{(1)}$ for transmission of the HARQ-ACK in a subframe n for a Third Generation Partnership Project (3GPP) Long Term Evolution (LTE) standard Release 11 PUCCH format 1b for the PDSCH transmission on the primary cell indicated by the detection of the corresponding PDCCH or the PDCCH indicating downlink semi-persistent scheduling (SPS) release in one subframe of bundling window with a downlink assignment index (DAI) value in the PDCCH equal to '1', wherein PUCCH resource $n_{PUCCH}^{(1)}$ is represented by:

$n_{PUCCH,i}^{(1)} = (M-m-1) \cdot N_c + m \cdot N_{c+1} + n_{CCE,m} + N_{PUCCH}^{(1)}$ for time division duplex (TDD) where the HARQ bundling window size M=max (Mp, Ms), and Mp is the primary HARQ bundling window size and Ms is the secondary HARQ bundling window size, $n_{CCE,m}$ is a first CCE index number used for transmission of the corresponding PDCCH in subframe n−$k_m$ of the bundling window and the corresponding m, where $k_m$ is the smallest value in set K such that UE detects a PDCCH in subframe n−$k_m$, $N_c$=max {0, $\lfloor N_{RB}^{DL} \cdot (N_{sc}^{RB} \cdot c-4)/36 \rfloor$} where c is a value out of {0, 1, 2, 3} such that $N_c \le n_{CCE,m} < N_{c+1}$, $N_{RB}^{DL}$ is a downlink bandwidth configuration, expressed in units of $N_{sc}^{RB}$, $N_{sc}^{RB}$ a resource block size in the frequency domain, expressed as a number of subcarriers, and $N_{PUCCH}^{(1)}$ is a starting PUCCH channel index for a PUCCH region in an uplink subframe and is configured by high layers for each UE;

for the SCell:

a PUCCH resource $n_{PUCCH}^{(1)}$ for transmission of the HARQ-ACK in a subframe n for the LTE PUCCH format 1b for the PDSCH transmission on the secondary cell indicated by the detection of the corresponding PDCCH on the primary cell in one subframe of bundling window with a downlink assignment index (DAI) value in the PDCCH equal to '1' or '2', wherein PUCCH resource $n_{PUCCH}^{(1)}$ is represented by $n_{PUCCH,i}^{(1)} = (M-m-1) \cdot N_c + m \cdot N_{c+1} + n_{CCE} + N_{PUCCH}^{(1)}$ time division duplex (TDD), where i =2 for the corresponding PDCCH with the DAI value equal to '1' and i=3 for the corresponding PDCCH with the DAI value equal to '2'; or a PUCCH resource $n_{PUCCH,2}^{(1)}$ and $n_{PUCCH,3}^{(1)}$ for transmission of the HARQ-ACK in a subframe n for the LTE PUCCH format 1b are indicated a ACK/negative ACK (NACK) resource indicator (ARI) for the PDSCH transmission indicated by the detection of the corresponding PDCCH within a subframe n−k is determined according to a higher layer configuration and a Third Generation Partnership Project (3GPP) Long Term Evolution (LTE) standard Release 11 Technical Specification (TS) 36.213 Table 9.2-2,

TABLE 9.2-2

PUCCH Resource value for Downlink Semi-Persistent Scheduling

| Value of 'TPC command for PUCCH' | $n_{PUCCH}^{(1,p)}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers | wherein the ARI re-interprets a transmit power control (TPC) filed in a downlink control information (DCI) format of the corresponding PDCCH.

6. The UE of claim 1, wherein the UE includes an antenna, a touch sensitive display screen, a speaker, a microphone, a graphics processor, an application processor, internal memory, or a non-volatile memory port.

7. A method for conditional hybrid automatic retransmission re-quest (HARQ) mapping for carrier aggregation (CA) at a user equipment (UE), comprising:

determining when a subframe for physical downlink shared channel (PDSCH) transmission is configured for downlink semi-persistent scheduling (SPS), wherein the subframe configured for downlink SPS generates a first condition;

generating HARQ-ACK states for the first condition for a HARQ bundling window with discontinuous transmission (DTX) padding for a secondary HARQ bundling window size for a secondary cell (SCell) and a primary HARQ bundling window size for a primary cell (PCell), wherein generating the HARQ-ACK states for the first condition further comprises:

for the PCell:
   generating a HARQ-ACK(0) corresponding to an ACK, a negative ACK (NACK), or a discontinuous transmission (DTX) response for the PDSCH transmission without the corresponding PDCCH for a Third Generation Partnership Project (3GPP) Long Term Evolution (LTE) standard Release 11 physical uplink control channel (PUCCH) format 1b,
   generating a HARQ-ACK(j) corresponding to the ACK, the NACK, or the DTX response for LTE standard Release 11 PUCCH format 1b, for $0 \leq j \leq M-1$, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j' or a PDCCH indicating a downlink SPS release and with a DAI value in the PDCCH equal to 'j' is received; otherwise generating a HARQ-ACK(j) set to a DTX; and for the SCell:
   generating a HARQ-ACK(j) corresponding to the ACK, the NACK, or the DTX response for LTE standard Release 11 PUCCH format 1b, for $0 \leq j \leq M-1$, where M=max (Mp,Ms), when the PDSCH transmission with the corresponding PDCCH and a downlink assignment index (DAT) value in the PDCCH equal to 'j+1' is received; otherwise generating a HARQ-ACK(j) set to a DTX;

generating HARQ-ACK states for a second condition for the HARQ bundling window with DTX padding including a DTX padding exception, wherein the second condition includes conditions not covered by the first condition, and the DTX padding exception generates a set of HARQ-ACK states to uniquely define each padded HARQ-ACK state; and generating a HARQ-ACK(j) with a DTX value except for a special case representing the DTX padding exception when the secondary HARQ bundling window size differs from the primary HARQ bundling window size, wherein the special case further comprises:

remapping a state of "ACK,NACK" for a serving cell with min(Mp,Ms)=2 to "ACK,DTX,DTX,DTX" for an ordered series {HARQ-ACK(0),HARQ-ACK(1), HARQ-ACK(2), HARQ-ACK (3)} when min(Mp,Ms)=2 and max(Mp,Ms)=4;

remapping a state of "NACK,ACK" for a serving cell with min(Mp,Ms)=2 to "ACK,ACK,ACK,NACK/DTX" for an ordered series {HARQ-ACK(0), HARQ-ACK(1),HARQ-ACK(2), HARQ-ACK (3)} when min(Mp,Ms)=2 and max(Mp,Ms)=4;

remapping a state of "NACK,ACK" for a serving cell with min(Mp,Ms)=2 to "ACK,ACK,ACK" for an ordered series {HARQ-ACK(0),HARQ-ACK(1), HARQ-ACK(2)} when min(Mp,Ms)=2 and max (Mp,Ms)=3;

remapping a state of "ACK,NACK, any" for a serving cell with min(Mp,Ms)=3 to "ACK,DTX,DTX,DTX" for an ordered series {HARQ-ACK(0),HARQ-ACK (1),HARQ-ACK(2), HARQ-ACK (3)} when min (Mp,Ms)=3 and max(Mp,Ms)=4;

remapping a state of "ACK,NACK" for a serving cell with min(Mp,Ms)=2 to "ACK,ACK,ACK,NACK/DTX" for an ordered series {HARQ-ACK(0), HARQ-ACK(1),HARQ-ACK(2), HARQ-ACK (3)} when min(Mp,Ms)=2 and max(Mp,Ms)=4;

remapping a state of "NACK,ACK" for a serving cell with min(Mp,Ms)=2 to "ACK,DTX,DTX,DTX" for an ordered series {HARQ-ACK(0),HARQ-ACK(1), HARQ-ACK(2), ARQ-ACK (3)} when min(Mp,Ms)=2 and max(Mp,Ms)=4;

remapping a state of "NACK,ACK" for a serving cell with min(Mp,Ms)=2 to "ACK,ACK,ACK" for an ordered series {HARQ-ACK(0),HARQ-ACK(1), HARQ-ACK(2)} when min(Mp,Ms)=2 and max (Mp,Ms)=3, or remapping a state of "ACK,NACK, any" for a serving cell with min(Mp,Ms)=3 to "ACK,DTX,DTX,DTX" for an ordered series {HARQ-ACK(0),HARQ-ACK (1),HARQ-ACK(2), HARQ-ACK (3)} when min (Mp,Ms)=3 and max(Mp,Ms)=4.

8. The method of claim 7, further comprising:
channel selecting based on a HARQ bundling window size M=max (Mp,Ms) using a HARQ-ACK multiplexing look-up table, where Mp is the primary HARQ bundling window size and Ms is the secondary HARQ bundling window size, wherein the HARQ-ACK multiplexing look-up table includes:

a Table 10.1.3.2-5 in a Third Generation Partnership Project (3GPP) Long Term Evolution (LTE) standard Release 11 Technical Specification (TS) 36.213 213 when M=3,

TABLE 10.1.3.2-5

| Transmission of HARQ-ACK multiplexing for M = 3 | | | | |
|---|---|---|---|---|
| Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation b(0), b(1) | RM Code Input Bits o(0),o(1),o(2),o(3) |
| ACK, ACK, ACK | ACK, ACK, ACK | $n^{(1)}_{PUCCH,1}$ | 1, 1 | 1, 1, 1, 1 |
| ACK, ACK, NACK/DTX | ACK, ACK, ACK | $n^{(1)}_{PUCCH,1}$ | 0, 0 | 1, 0, 1, 1 |
| ACK, NACK/DTX, any | ACK, ACK, ACK | $n^{(1)}_{PUCCH,3}$ | 1, 1 | 0, 1, 1, 1 |
| NACK/DTX, any, any | ACK, ACK, ACK | $n^{(1)}_{PUCCH,3}$ | 0, 1 | 0, 0, 1, 1 |
| ACK, ACK, ACK | ACK, ACK, NACK/DTX | $n^{(1)}_{PUCCH,0}$ | 1, 0 | 1, 1, 1, 0 |
| ACK, ACK, NACK/DTX | ACK, ACK, NACK/DTX | $n^{(1)}_{PUCCH,3}$ | 1, 0 | 1, 0, 1, 0 |
| ACK, NACK/DTX, any | ACK, ACK, NACK/DTX | $n^{(1)}_{PUCCH,0}$ | 0, 1 | 0, 1, 1, 0 |

TABLE 10.1.3.2-5-continued

Transmission of HARQ-ACK multiplexing for M = 3

| Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation $b(0), b(1)$ | RM Code Input Bits $o(0),o(1),o(2),o(3)$ |
|---|---|---|---|---|
| NACK/DTX, any, any | ACK, ACK, NACK/DTX | $n^{(1)}_{PUCCH,3}$ | 0, 0 | 0, 0, 1, 0 |
| ACK, ACK, ACK | ACK, NACK/DTX, any | $n^{(1)}_{PUCCH,2}$ | 1, 1 | 1, 1, 0, 1 |
| ACK, ACK, NACK/DTX | ACK, NACK/DTX, any | $n^{(1)}_{PUCCH,2}$ | 0, 1 | 1, 0, 0, 1 |
| ACK, NACK/DTX, any | ACK, NACK/DTX, any | $n^{(1)}_{PUCCH,2}$ | 1, 0 | 0, 1, 0, 1 |
| NACK/DTX, any, any | ACK, NACK/DTX, any | $n^{(1)}_{PUCCH,2}$ | 0, 0 | 0, 0, 0, 1 |
| ACK, ACK, ACK | NACK/DTX, any, any | $n^{(1)}_{PUCCH,1}$ | 1, 0 | 1, 1, 0, 0 |
| ACK, ACK, NACK/DTX | NACK/DTX, any, any | $n^{(1)}_{PUCCH,1}$ | 0, 1 | 1, 0, 0, 0 |
| ACK, NACK/DTX, any | NACK/DTX, any, any | $n^{(1)}_{PUCCH,0}$ | 1, 1 | 0, 1, 0, 0 |
| NACK, any, any | NACK/DTX, any, any | $n^{(1)}_{PUCCH,0}$ | 0, 0 | 0, 0, 0, 0 |
| DTX, any, any | NACK/DTX, any, any | No Transmission | | 0, 0, 0, 0 | or a Table 10.1.3.2-6 in the TS 36.213 when M=4;

TABLE 10.1.3.2-6

Transmission of HARQ-ACK multiplexing for M = 4

| Primary Cell HARQ-ACK(0), HARQ-ACK(1), HARQ-ACK(2) HARQ-ACK(3) | Secondary Cell HARQ-ACK(0), HARQ-ACK(1), HARQ-ACK(2) HARQ-ACK(3) | Resource $n^{(1)}_{PUCCH}$ | Constellation $b(0), b(1)$ | RM Code Input Bits $o(0),o(1),o(2),o(3)$ |
|---|---|---|---|---|
| ACK, ACK, ACK NACK/DTX | ACK, ACK, ACK NACK/DTX | $n^{(1)}_{PUCCH,1}$ | 1, 1 | 1, 1, 1, 1 |
| ACK, ACK, NACK/DTX, any | ACK, ACK, ACK NACK/DTX | $n^{(1)}_{PUCCH,1}$ | 0, 0 | 1, 0, 1, 1 |
| ACK, DTX, DTX, DTX | ACK, ACK, ACK NACK/DTX | $n^{(1)}_{PUCCH,3}$ | 1, 1 | 0, 1, 1, 1 |
| ACK, ACK, ACK, ACK, | ACK, ACK, ACK NACK/DTX | $n^{(1)}_{PUCCH,3}$ | 1, 1 | 0, 1, 1, 1 |
| NACK/DTX, any, any, any | ACK, ACK, ACK NACK/DTX | $n^{(1)}_{PUCCH,3}$ | 0, 1 | 0, 0, 1, 1 |
| (ACK, NACK/DTX any, any) except for (ACK, DTX, DTX, DTX) | ACK, ACK, ACK NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any), except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, ACK, ACK, ACK | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK | $n^{(1)}_{PUCCH,2}$ | 0, 0 | 0, 0, 0, 1 |
| ACK, ACK, ACK, NACK/DTX | NACK/DTX, any, any, any | $n^{(1)}_{PUCCH,1}$ | 1, 0 | 1, 1, 0, 0 |
| ACK, ACK, ACK, NACK/DTX | (ACK, NACK/DTX, any, any), except for (ACK, DTX, DTX, DTX) | $n^{(1)}_{PUCCH,1}$ | 1, 0 | 1, 1, 0, 0 |
| ACK, ACK, NACK/DTX, any | NACK/DTX, any, any, any | $n^{(1)}_{PUCCH,1}$ | 0, 1 | 1, 0, 0, 0 |
| ACK, ACK, NACK/DTX, any | (ACK, NACK/DTX, any, any), except for (ACK, DTX, DTX, DTX) | $n^{(1)}_{PUCCH,1}$ | 0, 1 | 1, 0, 0, 0 |
| ACK, DTX, DTX, DTX | NACK/DTX, any, any, any | $n^{(1)}_{PUCCH,0}$ | 1, 1 | 0, 1, 0, 0 |
| ACK, DTX, DTX, DTX | (ACK, NACK/DTX, any, any), except for (ACK, DTX, DTX, DTX) | $n^{(1)}_{PUCCH,0}$ | 1, 1 | 0, 1, 0, 0 |
| ACK, ACK, ACK, ACK, | NACK/DTX, any, any, any | $n^{(1)}_{PUCCH,0}$ | 1, 1 | 0, 1, 0, 0 |
| ACK, ACK, ACK, ACK, | (ACK, NACK/DTX, any, any), except for (ACK, DTX, DTX, DTX) | $n^{(1)}_{PUCCH,0}$ | 1, 1 | 0, 1, 0, 0 |

TABLE 10.1.3.2-6-continued

Transmission of HARQ-ACK multiplexing for M = 4

| Primary Cell HARQ-ACK(0), HARQ-ACK(1), HARQ-ACK(2) HARQ-ACK(3) | Secondary Cell HARQ-ACK(0), HARQ-ACK(1), HARQ-ACK(2) HARQ-ACK(3) | Resource $n^{(1)}_{PUCCH}$ | Constellation b(0), b(1) | RM Code Input Bits o(0),o(1),o(2),o(3) |
|---|---|---|---|---|
| NACK, any, any, any | NACK/DTX, any, any, any | $n^{(1)}_{PUCCH,0}$ | 0, 0 | 0, 0, 0, 0 |
| NACK, any, any, any | (ACK, NACK/DTX, any, any), except for (ACK, DTX, DTX, DTX) | $n^{(1)}_{PUCCH,0}$ | 0, 0 | 0, 0, 0, 0 |
| (ACK, NACK/DTX, any, any), except for (ACK, DTX, DTX, DTX) | NACK/DTX, any, any, any | $n^{(1)}_{PUCCH,0}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n^{(1)}_{PUCCH,0}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 | and
transmitting the HARQ-ACK states using the constellation bits b(0) and b(1) in the a physical uplink control channel (PUCCH) resource $n_{PUCCH}^{(1)}$, wherein the constellation bits b(0) and b(1) and the PUCCH resource $n_{PUCCH}^{(1)}$ are based on the HARQ-ACK multiplexing look-up table.

9. The method of claim 7, wherein generating the HARQ-ACK states for the second condition further comprises:
generating a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink SPS release and with a DAI value in the PDCCH equal to 'j+1' is received.

10. The method of claim 7, further comprising:
receiving an uplink-downlink (UL-DL) configuration for the primary cell and an UL-DL configuration for the secondary cell (SCell), wherein the UL-DL configuration for the PCell is included a system information block 1 (SIB1) transmitted on the PCell and the UL-DL configuration for the SCell is included a SIB1 transmitted on the SCell; and
determining the secondary HARQ bundling window size for a subframe based on the UL-DL configuration for the SCell and the primary HARQ bundling window size for the subframe based on the UL-DL configuration for the PCell.

11. At least one non-transitory machine readable storage medium comprising a plurality of instructions adapted to be executed to implement the method of claim 7.

12. A device at a node configured to detect a hybrid automatic retransmission re-quest (HARQ) bundle used in carrier aggregation (CA), comprising:
a transceiver to receive constellation bits in a physical uplink control channel (PUCCH) resource in a subframe transmitted in a primary cell (PCell) for a physical downlink shared channel (PDSCH) of the PCell and a PDSCH for a secondary cell (SCell); and
a processor to:
determine a HARQ bundling window size based on a primary HARQ bundling window size for the subframe based on an UL-DL configuration for a primary cell (PCell) and a secondary HARQ bundling window size for a subframe based on an uplink-downlink (UL-DL) configuration for a secondary cell (SCell),
determine a HARQ-ACKnowledge (ACK) response for the subframe using the HARQ bundling window size, constellation bits, and the PUCCH resource,
determine when condition 1 exists, wherein the condition 1 occurs when the subframe is transmitted without a corresponding a physical downlink control channel (PDCCH) within a HARQ bundling window,
decode HARQ-ACK states for the condition 1 for the HARQ bundling window with discontinuous transmission (DTX) padding when a secondary HARQ bundling window size for a secondary cell (SCell) differs from a primary HARQ bundling window size for a primary cell (PCell), and
decode HARQ-ACK states for a condition 2 for the HARQ bundling window with DTX padding including a DTX padding exception when the secondary HARQ bundling window size differs from the primary HARQ bundling window size, wherein the condition 2 includes conditions not covered by the condition 1, and the DTX padding exception decodes a unique HARQ-ACK state for each padded HARQ-ACK state,
wherein the processor configured to decode HARQ-ACK states for the condition 2 is further configured to:
for the PCell:
decode a HARQ-ACK(0) corresponding to an ACK, a negative ACK (NACK), or a discontinuous transmission (DTX) response for the PDSCH transmission without the corresponding PDCCH for a Third Generation Partnership Project (3GPP) Long Term Evolution (LTE) standard Release 11 physical uplink control channel (PUCCH) format 1b, or decode a HARQ-ACK(j) corresponding to the ACK, the NACK, or the DTX response for LTE standard Release 11 PUCCH format 1b, for 0≤j≤M−1, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j' or a PDCCH indicating a downlink semi-persistent scheduling (SPS) release and with a DAI value in the PDCCH equal to 'j' is received; otherwise decode a HARQ-ACK(j) set to a DTX; and for the SCell:
decode a HARQ-ACK(j) corresponding to the ACK, the NACK, or the DTX response for LTE standard Release 11 PUCCH format 1b, for 0≤j≤M−1, where M=max (Mp,Ms), when the PDSCH transmission with the corresponding PDCCH and a downlink assignment index (DAI) value in the PDCCH equal to 'j+1' is received; otherwise decode a HARQ-ACK(j) set to a DTX, wherein the processor is further configured to decode a HARQ-ACK(j) set to a DTX with an exception for a special case representing the DTX padding exception, wherein the processor is further configured for the special case to:

remap a state of "ACK,DTX,DTX,DTX" for an ordered series {HARQ-ACK(0),HARQ-ACK(1), HARQ-ACK(2), HARQ-ACK (3)} for a serving cell with min(Mp,Ms)=2 to "ACK,NACK" when min (Mp,Ms)=2 and max(Mp,Ms)=4;

remap a state of "ACK,ACK,ACK,NACK/DTX" for an ordered series {HARQ-ACK(0),HARQ-ACK(1), HARQ-ACK(2), HARQ-ACK (3)} for a serving cell with min(Mp,Ms)=2 to "NACK,ACK" when min (Mp,Ms)=2 and max(Mp,Ms)=4;

remap a state of "ACK,ACK,ACK" for an ordered series {HARQ-ACK0),HARQ-ACK(1),HARQ-ACK(2)} for a serving cell with min(Mp,Ms)=2 to "NACK,ACK" when min(Mp,Ms)=2 and max(Mp, Ms)=3;

remap a state of "ACK,DTX,DTX,DTX" for an ordered series {HARQ-ACK(0),HARQ-ACK(1), HARQ-ACK(2), HARQ-ACK (3)} for a serving cell with min(Mp,Ms)=3 to "ACK,NACK, any" when min(Mp,Ms)=3 and max(Mp,Ms)=4;

remap a state of "ACK,ACK,ACK,NACK/DTX" for an ordered series {HARQ-ACK(0),HARQ-ACK(1), HARQ-ACK(2), HARQ-ACK (3)} for a serving cell with min(Mp,Ms)=2 to "ACK,NACK" when min (Mp,Ms)=2 and max(Mp,Ms)=4;

remap a state of "ACK,DTX,DTX,DTX" for an ordered series {HARQ-ACK(0),HARQ-ACK(1), HARQ-ACK(2), HARQ-ACK (3)} for a serving cell with min(Mp,Ms)=2 to "NACK,ACK" when min (Mp,Ms)=2 and max(Mp,Ms)=4, remap a state of "ACK,ACK,ACK" for an ordered series {HARQ-ACK(0),HARQ-ACK(1),HARQ-ACK(2)} for a serving cell with min(Mp,Ms)=2 to "NACK,ACK" when min(Mp,Ms)=2 and max(Mp, Ms)=3, or remap a state of "ACK,DTX,DTX,DTX" for an ordered series {HARQ-ACK(0),HARQ-ACK(1), HARQ-ACK(2), HARQ-ACK (3)} for a serving cell with min(Mp,Ms)=3 to "ACK,NACK, any" when min(Mp,Ms)=3 and max(Mp,Ms)=4.

13. The device of claim 12, wherein the processor configured to decode HARQ-ACK states is further configured to:

decode a channel based on constellation bits b(0) and b(1), a physical uplink control channel (PUCCH) resource $n_{PUCCH}^{(1)}$, and a HARQ bundling window size M=max (Mp,Ms) using a HARQ-ACK multiplexing look-up table, where Mp is the primary HARQ bundling window size and Ms is the secondary HARQ bundling window size, wherein the HARQ-ACK multiplexing look-up table includes:

a Table 10.1.3.2-5 in a Third Generation Partnership Project (3GPP) Long Term Evolution (LTE) standard Release 11 Technical Specification (TS) 36.213 when M=3,

TABLE 10.1.3.2-5

| Transmission of HARQ-ACK multiplexing for M = 3 | | | | |
| --- | --- | --- | --- | --- |
| Primary Cell HARQ-ACK(0), HARQ-ACK(1), HARQ-ACK(2) | Secondary Cell HARQ-ACK(0), HARQ-ACK(1), HARQ-ACK(2) | Resource $n^{(1)}_{PUCCH}$ | Constellation b(0), b(1) | RM Code Input Bits o(0),o(1),o(2),o(3) |
| ACK, ACK, ACK | ACK, ACK, ACK | $n^{(1)}_{PUCCH,1}$ | 1, 1 | 1, 1, 1, 1 |
| ACK, ACK, NACK/DTX | ACK, ACK, ACK | $n^{(1)}_{PUCCH,1}$ | 0, 0 | 1, 0, 1, 1 |
| ACK, NACK/DTX, any | ACK, ACK, ACK | $n^{(1)}_{PUCCH,3}$ | 1, 1 | 0, 1, 1, 1 |
| NACK/DTX, any, any | ACK, ACK, ACK | $n^{(1)}_{PUCCH,3}$ | 0, 1 | 0, 0, 1, 1 |
| ACK, ACK, ACK | ACK, ACK, NACK/DTX | $n^{(1)}_{PUCCH,0}$ | 1, 0 | 1, 1, 1, 0 |
| ACK, ACK, NACK/DTX | ACK, ACK, NACK/DTX | $n^{(1)}_{PUCCH,3}$ | 1, 0 | 1, 0, 1, 0 |
| ACK, NACK/DTX, any | ACK, ACK, NACK/DTX | $n^{(1)}_{PUCCH,0}$ | 0, 0 | 0, 1, 1, 0 |
| NACK/DTX, any, any | ACK, ACK, NACK/DTX | $n^{(1)}_{PUCCH,3}$ | 0, 0 | 0, 0, 1, 0 |
| ACK, ACK, ACK | ACK, NACK/DTX, any | $n^{(1)}_{PUCCH,2}$ | 1, 1 | 1, 1, 0, 1 |
| ACK, ACK, NACK/DTX | ACK, NACK/DTX, any | $n^{(1)}_{PUCCH,2}$ | 0, 1 | 1, 0, 0, 1 |
| ACK, NACK/DTX, any | ACK, NACK/DTX, any | $n^{(1)}_{PUCCH,2}$ | 1, 0 | 0, 1, 0, 1 |
| NACK/DTX, any, any | ACK, NACK/DTX, any | $n^{(1)}_{PUCCH,2}$ | 0, 0 | 0, 0, 0, 1 |
| ACK, ACK, ACK | NACK/DTX, any, any | $n^{(1)}_{PUCCH,1}$ | 1, 0 | 1, 1, 0, 0 |
| ACK, ACK, NACK/DTX | NACK/DTX, any, any | $n^{(1)}_{PUCCH,1}$ | 0, 1 | 1, 0, 0, 0 |
| ACK, NACK/DTX, any | NACK/DTX, any, any | $n^{(1)}_{PUCCH,0}$ | 1, 1 | 0, 1, 0, 0 |
| NACK, any, any | NACK/DTX, any, any | $n^{(1)}_{PUCCH,0}$ | 0, 0 | 0, 0, 0, 0 |
| DTX, any, any | NACK/DTX, any, any | No Transmission | | 0, 0, 0, 0 | or a Table 10.1.3.2-6 in the TS 36.213 when M=4.

TABLE 10.1.3.2-6

Transmission of HARQ-ACK multiplexing for M = 4

| Primary Cell HARQ-ACK(0), HARQ-ACK(1), HARQ-ACK(2) HARQ-ACK(3) | Secondary Cell HARQ-ACK(0), HARQ-ACK(1), HARQ-ACK(2) HARQ-ACK(3) | Resource $n^{(1)}_{PUCCH}$ | Constellation b(0), b(1) | RM Code Input Bits o(0),o(1),o(2),o(3) |
|---|---|---|---|---|
| ACK, ACK, ACK NACK/DTX | ACK, ACK, ACK NACK/DTX | $n^{(1)}_{PUCCH,1}$ | 1, 1 | 1, 1, 1, 1 |
| ACK, ACK, NACK/DTX, any | ACK, ACK, ACK NACK/DTX | $n^{(1)}_{PUCCH,1}$ | 0, 0 | 1, 0, 1, 1 |
| ACK, DTX, DTX, DTX | ACK, ACK, ACK NACK/DTX | $n^{(1)}_{PUCCH,3}$ | 1, 1 | 0, 1, 1, 1 |
| ACK, ACK, ACK, ACK, | ACK, ACK, ACK NACK/DTX | $n^{(1)}_{PUCCH,3}$ | 1, 1 | 0, 1, 1, 1 |
| NACK/DTX, any, any, any | ACK, ACK, ACK NACK/DTX | $n^{(1)}_{PUCCH,3}$ | 0, 1 | 0, 0, 1, 1 |
| (ACK, NACK/DTX any, any) except for (ACK, DTX, DTX, DTX) | ACK, ACK, ACK NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any), except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, ACK, ACK, ACK | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |
| (ACK, NACK/DTX, any, any), except for (ACK, DTX, DTX, DTX) | ACK, ACK, ACK, ACK | $n^{(1)}_{PUCCH,2}$ | 0, 0 | 0, 0, 0, 1 |
| ACK, ACK, ACK, NACK/DTX | NACK/DTX, any, any, any | $n^{(1)}_{PUCCH,1}$ | 1, 0 | 1, 1, 0, 0 |
| ACK, ACK, ACK, NACK/DTX | (ACK, NACK/DTX, any, any), except for (ACK, DTX, DTX, DTX) | $n^{(1)}_{PUCCH,1}$ | 1, 0 | 1, 1, 0, 0 |
| ACK, ACK, NACK/DTX, any | NACK/DTX, any, any, any | $n^{(1)}_{PUCCH,1}$ | 0, 1 | 1, 0, 0, 0 |
| ACK, ACK, NACK/DTX, any | (ACK, NACK/DTX, any, any), except for (ACK, DTX, DTX, DTX) | $n^{(1)}_{PUCCH,1}$ | 0, 1 | 1, 0, 0, 0 |
| ACK, DTX, DTX, DTX | NACK/DTX, any, any, any | $n^{(1)}_{PUCCH,0}$ | 1, 1 | 0, 1, 0, 0 |
| ACK, DTX, DTX, DTX | (ACK, NACK/DTX, any, any), except for (ACK, DTX, DTX, DTX) | $n^{(1)}_{PUCCH,0}$ | 1, 1 | 0, 1, 0, 0 |
| ACK, ACK, ACK, ACK, | NACK/DTX, any, any, any | $n^{(1)}_{PUCCH,0}$ | 1, 1 | 0, 1, 0, 0 |
| ACK, ACK, ACK, ACK, | (ACK, NACK/DTX, any, any), except for (ACK, DTX, DTX, DTX) | $n^{(1)}_{PUCCH,0}$ | 1, 1 | 0, 1, 0, 0 |
| NACK, any, any, any | NACK/DTX, any, any, any | $n^{(1)}_{PUCCH,0}$ | 0, 0 | 0, 0, 0, 0 |
| NACK, any, any, any | (ACK, NACK/DTX, any, any), except for (ACK, DTX, DTX, DTX) | $n^{(1)}_{PUCCH,0}$ | 0, 0 | 0, 0, 0, 0 |
| (ACK, NACK/DTX, any, any), except for (ACK, DTX, DTX, DTX) | NACK/DTX, any, any, any | $n^{(1)}_{PUCCH,0}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n^{(1)}_{PUCCH,0}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

14. The device of claim 12, wherein the processor configured to decode HARQ-ACK states for the condition 1 is further configured to:
  decode a HARQ-ACK(j) corresponding to an ACK, a negative ACK (NACK), or a discontinuous transmission (DTX) response for a Third Generation Partnership Project (3GPP) Long Term Evolution (LTE) standard Release 11 physical uplink control channel (PUCCH) format 1b, for $0 \leq j \leq M-1$, where M=max (Mp,Ms), and Mp is the primary HARQ bundling window size and Ms is the secondary HARQ bundling window size, when the PDSCH transmission with the corresponding PDCCH and a downlink assignment index (DAI) value in the PDCCH equal to 'j+1' or a PDCCH indicating a downlink semi-persistent scheduling (SPS) release and with a DAI value in the PDCCH equal to 'j+1' is received.

15. The device of claim 12, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and a central processing module (CPM).

* * * * *